(12) United States Patent
Nishi et al.

(10) Patent No.: US 7,515,768 B2
(45) Date of Patent: Apr. 7, 2009

(54) METHOD, AND APPARATUS FOR PROCESSING IMAGE, RECORDING MEDIUM AND COMPUTER PROGRAM

(75) Inventors: Toru Nishi, Tokyo (JP); Kazuhiko Ueda, Kanagawa (JP); Mitsuyasu Asano, Tokyo (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 11/293,268

(22) Filed: Dec. 5, 2005

(65) Prior Publication Data

US 2006/0146168 A1    Jul. 6, 2006

(30) Foreign Application Priority Data

Dec. 7, 2004   (JP)   ............................. P2004-354576
Jun. 8, 2005   (JP)   ............................. P2005-168428

(51) Int. Cl.
*G06K 9/40*     (2006.01)
*G06K 15/00*    (2006.01)

(52) U.S. Cl. ..................... 382/275; 358/3.26

(58) Field of Classification Search ................ 382/162, 382/275, 299, 305, 312, 254, 255, 260, 264, 382/274; 348/208.2, 208.4, 333.01, 335; 396/52; 358/3.26, 3.27
See application file for complete search history.

(56) References Cited

U.S. PATENT DOCUMENTS 5,712,474 A * 1/1998 Naneda ................... 250/208.1
6,046,768 A * 4/2000 Kaneda et al. ........... 348/208.2
2001/0048475 A1* 12/2001 Shiomi ....................... 348/208
2002/0102100 A1* 8/2002 Kasuya ......................... 396/53
2002/0105583 A1    8/2002 Matsutani et al.
2004/0041936 A1* 3/2004 Uchiyama ................... 348/335

FOREIGN PATENT DOCUMENTS

| JP | 63-059267   | 3/1988  |
| JP | 7-59054     | 3/1995  |
| JP | 2000-324364 | 11/2000 |
| JP | 2004-234051 | 8/2004  |

OTHER PUBLICATIONS

M.R. Banham et al.; "Digital Image Restoration"; IEEE Signal Processing Magazine, IEEE Service Center, vol. 14; No. 2; Mar. 1997; pp. 24-41.

* cited by examiner

*Primary Examiner*—Kanji Patel
(74) *Attorney, Agent, or Firm*—Finnegan, Henderson, Farabow, Garrett & Dunner, L.L.P.

(57) ABSTRACT

An image processing apparatus includes a corrector for correcting a pixel value of each of a plurality of pixels forming each access unit to be processed, based on at least one of the parameter values corresponding to the access unit to be processed. The corrector includes an acquisition unit for acquiring input pixel values, a first mean value calculating unit for calculating a first mean pixel value, a second mean value calculating unit for calculating a second mean pixel value, a correction value determination unit for determining a correction value, and an adding unit for adding the correction value to the input pixel value of a target pixel.

16 Claims, 27 Drawing Sheets

METHOD, AND APPARATUS FOR PROCESSING IMAGE, RECORDING MEDIUM AND COMPUTER PROGRAM

CROSS REFERENCES TO RELATED APPLICATIONS

The present invention contains subject matter related to Japanese Patent Application JP 2004-354576 filed in the Japanese Patent Office on Dec. 7, 2004, and Japanese Patent Application JP 2005-168428 filed in the Japanese Patent Office on Jun. 8, 2005, the entire contents of which are incorporated herein by reference.

BACKGROUND OF THE INVENTION

1. Field of the Invention

The present invention relates to a method and apparatus for processing image, a recording medium, and a computer program and, in particular, to a method and apparatus for processing information, a recording medium and a computer program for displaying a clearer image by controlling image degradation due to image blur.

2. Description of the Related Art

A frame rate conversion technique is disclosed in Japanese Unexamined Patent Application Publication No. 7-59054. In accordance with the disclosure, a video signal conversion apparatus for displaying a video (including a moving image) adjusts a frame rate to display the video in a manner free from image quality degradation even when no fixed synchronization relationship is present in a frame frequency or a field frequency between an input television format and an output television format.

SUMMARY OF THE INVENTION

When a frame rate is increased using the frame rate conversion technique disclosed in Japanese Unexamined Patent Application Publication No. 7-59054, no consideration is given to image blur occurring during image pickup (hereinafter pickup blur). Image degradation due to the pickup blur thus remains unimproved, causing difficulty in the displaying of a clear image on the screen of a display.

It is thus desirable to display a clear image subsequent to the frame rate conversion with image blur controlled.

Japanese Patent Application No. 2004-234051 filed by the same assignee of this invention discloses an image processing apparatus, a method, a recording medium and a computer program for displaying a clear image subsequent to frame rate conversion. It is also desirable to provide a method and apparatus for processing information, a recording medium, and a computer program different in structure and process steps from those disclosed in Japanese Patent Application No. 2004-234051.

In one embodiment of the present invention, an image processing apparatus for acquiring, on a per access unit basis, a value of at least one parameter indicating characteristics of image blur taking place during the image pickup of a moving image by a predetermined image pickup device, a plurality of access units forming the moving image picked up by the image pickup device, or acquiring the parameter value from the outside, includes a corrector for correcting a pixel value of each of a plurality of pixels forming each access unit to be processed, based on at least one of the parameter values corresponding to the access unit to be processed. The corrector includes an acquisition unit for setting, as a target pixel, one of the plurality of pixels forming the access unit to be processed, and acquiring input pixel values of n pixels (n being an integer equal to or more than 3) centered on the target pixel and arranged in a first direction, a first mean value calculating unit for determining a calculation range of input pixel values of k pixels (k being an integer less than n/2) arranged further in the first direction than the target pixel from among the input pixel values acquired by the acquisition unit based the parameter value corresponding to the target pixel, and calculating, as a mean pixel value in the first direction, the mean value of the input pixel values falling within the calculation range, a second mean value calculating unit for determining a calculation range of input pixel values of k pixels arranged further in a second direction, opposed to the first direction, than the target pixel from among the input pixel values acquired by the acquisition unit based the parameter value corresponding to the target pixel, and calculating, as a mean pixel value in the second direction, the mean value of the input pixel values falling within the calculation range, a correction value determination unit for determining a correction value correcting the input pixel value of the target pixel based on the relationship of the first direction mean pixel value calculated by the first mean value calculating unit, the input pixel value of the target pixel; the second direction mean pixel value calculated by the second mean value calculating unit, and a first adding unit for adding the correction value determined by the correction value determination unit to the input pixel value of the target pixel, and outputting the resulting sum as an output pixel value of the target pixel.

The image processing apparatus may further include a third mean value calculating unit for calculating, as a target mean pixel value, a mean value of input pixel values of the target pixel and m pixels adjacent to the target pixel (m being an integer equal to or more than 1). The correction value determination unit includes a candidate determiner for determining, as a first candidate, a difference value between the first direction mean pixel value and the input pixel value of the target pixel, and as a second candidate, a difference value between the second direction mean pixel value and the input pixel value of the target pixel, an adjustment value determiner for determining an adjustment value adjusting the correction value, using the positional relationship of a first point indicating the first direction mean pixel value, a second point indicating the target pixel mean pixel value calculated by the third mean value calculating unit, and a third point indicating the second direction mean pixel value in a plane defined by a first axis representing positions of the pixels, and a second axis representing pixel values, an adjuster for adjusting the first candidate and the second candidate, determined by the candidate determination unit, using the adjustment value determined by the adjustment value determination unit, and a selector for selecting one of the first and second candidates, adjusted by the adjuster, and a predetermined fixed value, under a predetermined selection criterion, and setting the selected value as the correction value.

The adjustment value determination unit may divide the absolute value of a second derivative value at the second point of a line connecting the first point, the second point and the third point, by a distance between the first point and the third point along the second axis, and determines the adjustment value based on the resulting quotient.

Each of the first mean value calculating unit and the second mean value calculating unit may determine whether the polarity of the slope of a line is changing in the plane defined by the first axis representing the positions of the pixels and the second axis representing the pixel values, the line connecting points respectively indicating the k input pixel values falling within the determined calculation range. If the polarity of the slope of the line is determined as being not changing, one of the first direction mean pixel value and the second direction mean pixel value is calculated using each of the k input pixel values. If the polarity of the slope of the line is determined as being changing, the input pixel value indicated by a point subsequent to the change in polarity, from among the k input pixel values, is corrected based on the input pixel value indicated by a point prior to the change in polarity, and one of the first direction mean pixel value and the second direction mean pixel value is calculated using both the corrected input pixel values from among the k input pixel values, and the remaining uncorrected input pixel values.

The corrector may further include a first corrector and a second corrector. The first corrector includes the acquisition unit, the first mean value calculating unit, the second mean value calculating unit, the correction value determination unit, and the first adding unit. The second corrector includes a motion averaging filtering unit for converting characteristics of a motion averaging filter indicating the image blur, in response to the value of one of the parameter values corresponding to the target pixel, performing a motion averaging filtering operation featuring the converted characteristic, on each of input pixel values of pixels in a predetermined block containing the target pixel, and outputting, as a first value, the resulting corrected input pixel value of the target pixel, a subtractor unit for calculating a difference between the input pixel value of the target pixel and the first value output from the motion averaging filtering unit, and outputting the difference as a second value, and a second adding unit for adding the second value output from the subtractor unit to the input pixel value of the target pixel, and outputting the resulting sum as an output pixel value of the target pixel.

The image processing apparatus may acquire, as the parameter value of the respective pixel, a motion vector in each of the plurality of pixels forming each of the plurality of access units forming the moving image.

The image processing apparatus may acquire, as the parameter value, a shutter speed of the image pickup device when each of the plurality of access units forming the moving image is picked up by the image pickup device.

The image processing apparatus may further include a rate conversion unit for performing a rate conversion operation converting a rate of the access unit in the moving image from a current first rate to a second rate higher than the first rate. The corrector corrects the pixel value of each of the plurality of pixels forming the access unit to be processed, before or after the rate conversion unit performs the rate conversion operation on the access unit to be processed.

Preferably, the first rate is 30 Hz while the second rate is 120 Hz.

Preferably, the first rate is 60 Hz while the second rate is 120 Hz.

Preferably, the first rate is 60 Hz while the second rate is 240 Hz.

Preferably, the first rate is 50 Hz while the second rate is 100 Hz.

Preferably, the first rate is 50 Hz while the second rate is 200 Hz.

In accordance with another embodiment of the present invention, an image processing method of detecting and acquiring, on a per access unit basis, a value of at least one parameter indicating characteristics of image blur taking place during the image pickup of a moving image by a predetermined image pickup device, a plurality of access units forming the moving image picked up by the image pickup device, or acquiring the parameter value from the outside, includes a step of correcting a pixel value of each of a plurality of pixels forming each access unit to be processed, based on at least one of the parameter values corresponding to the access unit to be processed. The correcting step includes an acquisition substep of setting, as a target pixel, one of the plurality of pixels forming the access unit to be processed, and acquiring input pixel values of n pixels (n being an integer equal to or more than 3) centered on the target pixel and arranged in a first direction, a first mean value calculating substep of determining a calculation range of input pixel values of k pixels (k being an integer less than n/2) arranged further in the first direction than the target pixel from among the input pixel values acquired in the acquisition substep based the parameter value corresponding to the target pixel, and calculating, as a mean pixel value in the first direction, the mean value of the input pixel values falling within the calculation range, a second mean value calculating substep of determining a calculation range of input pixel values of k pixels arranged further in a second direction, opposed to the first direction, than the target pixel from among the input pixel values acquired in the acquisition substep based the parameter value corresponding to the target pixel, and calculating, as a mean pixel value in the second direction, the mean value of the input pixel values falling within the calculation range, a correction value determination substep of determining a correction value correcting the input pixel value of the target pixel based on the relationship of the first direction mean pixel value calculated in the first mean value calculating substep, the input pixel value of the target pixel, the second direction mean pixel value calculated in the second mean value calculating substep, and an adding substep of adding the correction value determined in the correction value determination substep to the input pixel value of the target pixel, and outputting the resulting sum as an output pixel value of the target pixel.

In accordance with another embodiment of the present invention, a computer program for causing a computer to acquire, on a per access unit basis, a value of at least one parameter indicating characteristics of image blur taking place during the image pickup of a moving image by a predetermined image pickup device, a plurality of access units forming the moving image picked up by the image pickup device, or to acquire the parameter value from the outside, includes program code for performing a step of correcting a pixel value of each of a plurality of pixels forming each access unit to be processed, based on at least one of the parameter values corresponding to the access unit to be processed. The correcting step includes an acquisition substep of setting, as a target pixel, one of the plurality of pixels forming the access unit to be processed, and acquiring input pixel values of n pixels (n being an integer equal to or more than 3) centered on the target pixel and arranged in a first direction, a first mean value calculating substep of determining a calculation range of input pixel values of k pixels (k being an integer less than n/2) arranged further in the first direction than the target pixel from among the input pixel values acquired in the acquisition substep based the parameter value corresponding to the target pixel, and calculating, as a mean pixel value in the first direction, the mean value of the input pixel values falling within the calculation range, a second mean value calculating substep of determining a calculation range of input pixel values of k pixels arranged further in a second direction, opposed to the first direction, than the target pixel from among the input pixel values acquired in the acquisition substep based the parameter value corresponding to the target pixel, and calculating, as a mean pixel value in the second direction, the mean value of the input pixel values falling within the calculation range, a correction value determination substep of determining a correction value correcting the input pixel value of the target pixel based on the relationship of the first direction mean pixel value calculated in the first mean value calculating substep, the input pixel value of the target pixel, the second direction mean pixel value calculated in the second mean value calculating substep, and an adding substep of adding the correction value determined in the correction value determination substep to the input pixel value of the target pixel, and outputting the resulting sum as an output pixel value of the target pixel.

In accordance with another embodiment of the present invention, a recording medium stores a computer program for causing a computer to acquire, on a per access unit basis, a value of at least one parameter indicating characteristics of image blur taking place during the image pickup of a moving image by a predetermined image pickup device, a plurality of access units forming the moving image picked up by the image pickup device, or to acquire the parameter value from the outside. The computer program includes program code for performing a step of correcting a pixel value of each of a plurality of pixels forming each access unit to be processed, based on at least one of the parameter values corresponding to the access unit to be processed. The correcting step includes an acquisition substep of setting, as a target pixel, one of the plurality of pixels forming the access unit to be processed, and acquiring input pixel values of n pixels (n being an integer equal to or more than 3) centered on the target pixel and arranged in a first direction, a first mean value calculating substep of determining a calculation range of input pixel values of k pixels (k being an integer less than n/2) arranged further in the first direction than the target pixel from among the input pixel values acquired in the acquisition substep based the parameter value corresponding to the target pixel, and calculating, as a mean pixel value in the first direction, the mean value of the input pixel values falling within the calculation range, a second mean value calculating substep of determining a calculation range of input pixel values of k pixels arranged further in a second direction, opposed to the first direction, than the target pixel from among the input pixel values acquired in the acquisition substep based the parameter value corresponding to the target pixel, and calculating, as a mean pixel value in the second direction, the mean value of the input pixel values falling within the calculation range, a correction value determination substep of determining a correction value correcting the input pixel value of the target pixel based on the relationship of the first direction mean pixel value calculated in the first mean value calculating substep, the input pixel value of the target pixel, the second direction mean pixel value calculated in the second mean value calculating substep, and an adding substep of adding the correction value determined in the correction value determination substep to the input pixel value of the target pixel, and outputting the resulting sum as an output pixel value of the target pixel.

In accordance with embodiments of the present invention, at least one parameter value indicating the characteristic of the pickup blur taking place during the moving image pickup by the image pickup device is acquired. The pixel value of each of the plurality of pixels forming the access unit to be processed is corrected. More in detail, in each of the plurality of access units forming the moving image, a pixel of interest from among the plurality of pixels forming the access unit to be process is set as a target pixel. The input pixel values of the respective n pixels (n being an integer equal to or more than 3) centered on the target pixel and arranged in the first direction are acquired. A calculation range of input pixel values of k pixels arranged further in the first direction than the target pixel from among the input pixel values acquired in the acquisition substep is determined. The mean value of the input pixel values falling within the determined calculation range is calculated as the first direction mean pixel value. Similarly, the mean value of the pixel values of the k pixels arranged further in the second direction opposite to the first direction than the target pixel is calculated as the second direction mean pixel value. The value k is determined based on the value of the parameter, i.e., being variable depending on the value of the parameter. The correction value for correcting the input pixel value of the target pixel is determined based on the relationship of the first direction mean pixel value, the input pixel of the target pixel, and the second direction mean pixel value. The correction value is added to the input pixel value of the target pixel. The resulting sum is output as the output pixel value of the target pixel, namely, the corrected pixel value of the target pixel.

In accordance with embodiments of the present invention, the pixel value of each pixel forming each access unit forming the moving image is corrected. The pixel value is corrected in such a manner that image degradation due to the pickup blur is controlled. A moving image subsequent to a frame rate conversion is displayed more clearly by performing the correction operation on the moving image before or after the frame rate conversion process.

DESCRIPTION OF THE PREFERRED EMBODIMENTS

Figure 1:
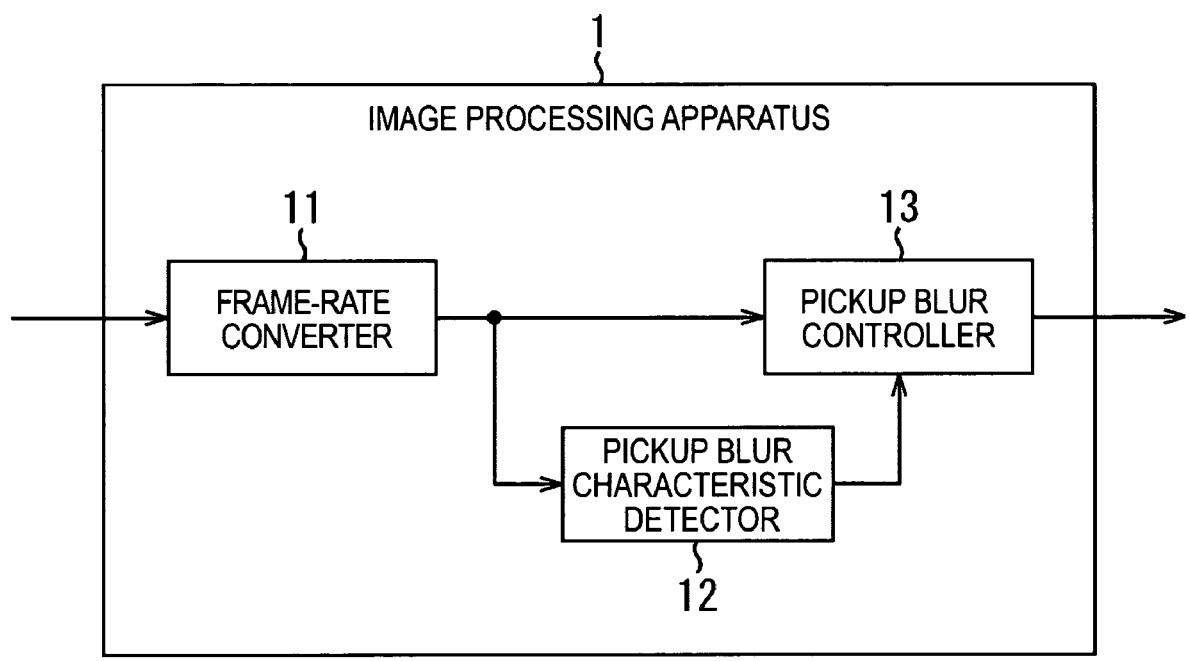
FIG. 1 is a functional block diagram of an image processing apparatus of one embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

In one embodiment of the present invention, an image processing apparatus (for example, one of an image processing apparatus 1 of FIG. 1, an image processing apparatus 212 of FIG. 25, an image processing apparatus 201 of FIG. 23, and an image processing apparatus 202 of FIG. 24, each including a pickup blur characteristic detector 12 detecting the value of a parameter, and an image processing apparatus 212 of FIG. 25 and an image processing apparatus 231 of FIG. 26, each acquiring the parameter value from the outside) acquires, on a per access unit basis, a value of at least one parameter indicating characteristics of image blur taking place during the image pickup of a moving image by a predetermined image pickup device, a plurality of access units forming the moving image picked up by the image pickup device, or acquires the parameter value from the outside. The image processing apparatus described herein is related to the image processing apparatus 1 of FIG. 1. The image processing apparatus includes a corrector (for example, a pickup blur controller 13 of FIG. 1) for correcting a pixel value of each of a plurality of pixels forming each access unit to be processed, based on at least one of the parameter values corresponding to the access unit to be processed. The corrector (for example, one of the pickup blur controllers 13 of FIGS. 5, 20, and 21, each including an ALTI module 81 of FIG. 12) includes an acquisition unit (DL units 91-1 through 91-n of FIG. 12) for setting, as a target pixel, one of the plurality of pixels forming the access unit to be processed, and acquiring input pixel values of n pixels (n being an integer equal to or more than 3) centered on the target pixel and arranged in a first direction, a first mean value calculating unit (for example, a mean value calculator 93 of FIG. 12) for determining a calculation range of input pixel values of k pixels (k being an integer less than n/2) arranged further in the first direction than the target pixel from among the input pixel values acquired by the acquisition unit based the parameter value corresponding to the target pixel, and calculating, as a mean pixel value in the first direction (for example, a value La of FIG. 12), the mean value of the input pixel values falling within the calculation range, a second mean value calculating unit (for example, a mean value calculator 94 of FIG. 12) for determining a calculation range of input pixel values of k pixels arranged further in a second direction, opposed to the first direction, than the target pixel from among the input pixel values acquired by the acquisition unit based the parameter value corresponding to the target pixel, and calculating, as a mean pixel value in the second direction (for example, a value Ra of FIG. 12), the mean value of the input pixel values falling within the calculation range, a correction value determination unit (for example, a correction value determiner 95 of FIG. 12) for determining a correction value (for example, a value ADD of FIG. 12) correcting the input pixel value of the target pixel based on the relationship of the first direction mean pixel value calculated by the first mean value calculating unit, the input pixel value of the target pixel (for example, a value N of FIG. 12), the second direction mean pixel value calculated by the second mean value calculating unit, and a first adding unit (an adder 96 of FIG. 12) for adding the correction value determined by the correction value determination unit to the input pixel value of the target pixel, and outputting the resulting sum as an output pixel value of the target pixel.

Figure 12:
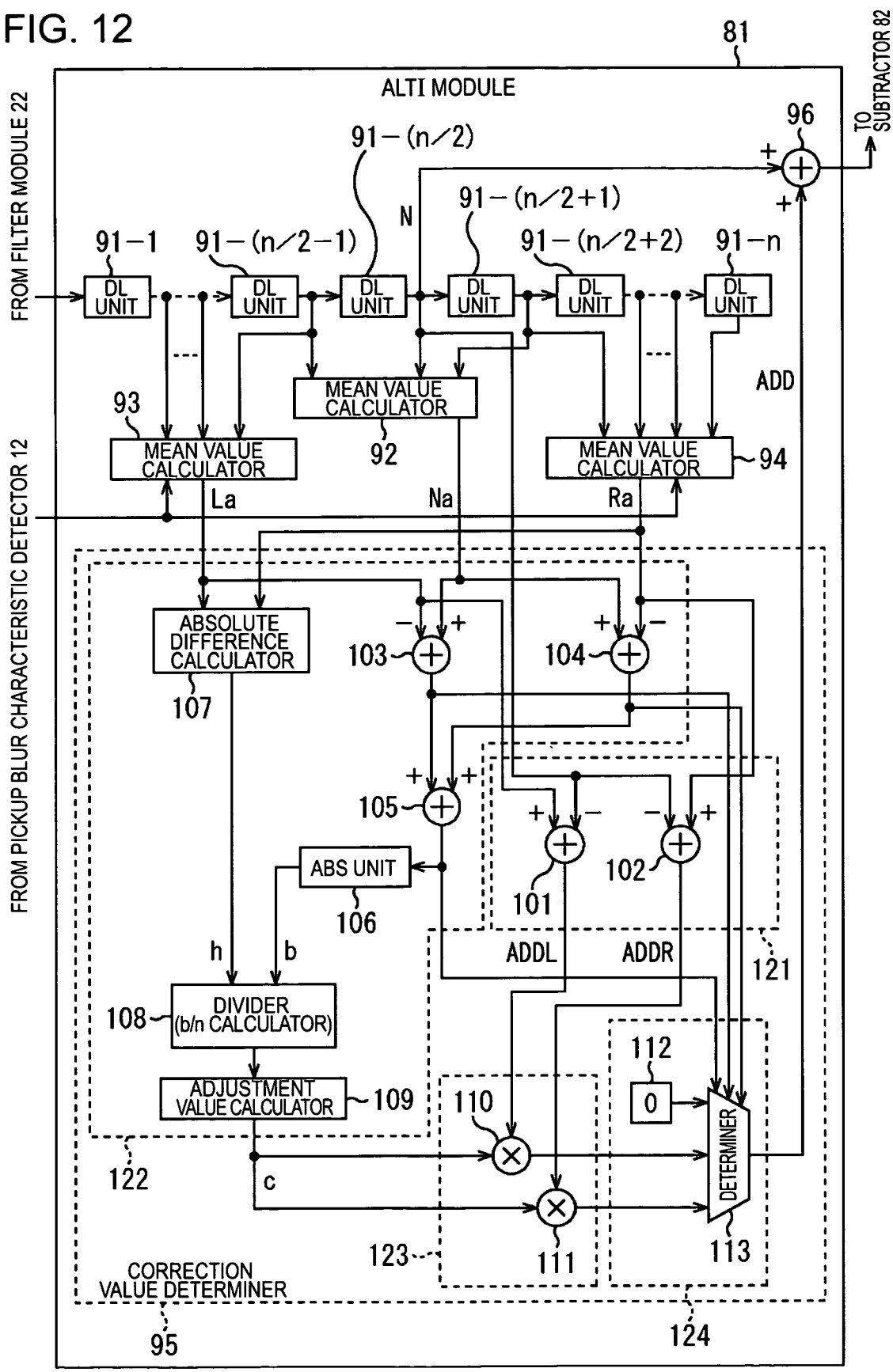
FIG. 12 is a functional block diagram of an ALTI module in the pickup blur corrector of FIG. 11.

The image processing apparatus further includes a third mean value calculating unit (for example, a mean value calculator 92 of FIG. 12)for calculating, as a target mean pixel value (for example, a value Na of FIG. 12), a mean value of input pixel values of the target pixel and m pixels adjacent to the target pixel (m being an integer equal to or more than 1, and being 2 in the case of FIG. 12). The correction value determination unit includes a candidate determiner (for example, a candidate determination unit 121 including an subtractor 101 and a subtractor 102 of FIG. 12) for determining, as a first candidate (for example, a value ADDL of FIG. 12), a difference value between the first direction mean pixel value and the input pixel value of the target pixel, and as a second candidate (for example, a value ADDR of FIG. 12), a difference value between the second direction mean pixel value and the input pixel value of the target pixel, an adjustment value determiner (for example, an adjustment value determination unit 122 including a subtractor 103 through am adjustment value calculator 109 of FIG. 12) for determining an adjustment value (for example, a value c of FIG. 12) adjusting the correction value, using the positional relationship of a first point indicating the first direction mean pixel value, a second point indicating the target pixel mean pixel value calculated by the third mean value calculating unit, and a third point indicating the second direction mean pixel value in a plane defined by a first axis representing location of the pixels, and a second axis representing pixel value, an adjuster (for example, an adjustment unit 123 including a multiplier 110 and a multiplier 111 of FIG. 12) for adjusting the first candidate and the second candidate, determined by the candidate determination unit, using the adjustment value determined by the adjustment value determiner, and a selector (for example, a selector 124 including a fixed value generator 112 and a determiner 113 of FIG. 12) for selecting one of the first and second candidates, adjusted by the adjuster, and a predetermined fixed value (for example, "0"), under a predetermined selection criterion, and setting the selected value as the correction value.

The adjustment value determination unit divides the absolute value (for example, a value b as an output signal of the ABS unit 106 of FIG. 12) of a second derivative value at the second point of a line connecting the first point, the second point and the third point, by a distance (for example, a value h as an output signal of an absolute difference calculator 107 of FIG. 12) between the first point and the third point along the second axis, and determines the adjustment value based on the resulting quotient (for example, quotient b/n).

Figure 3:
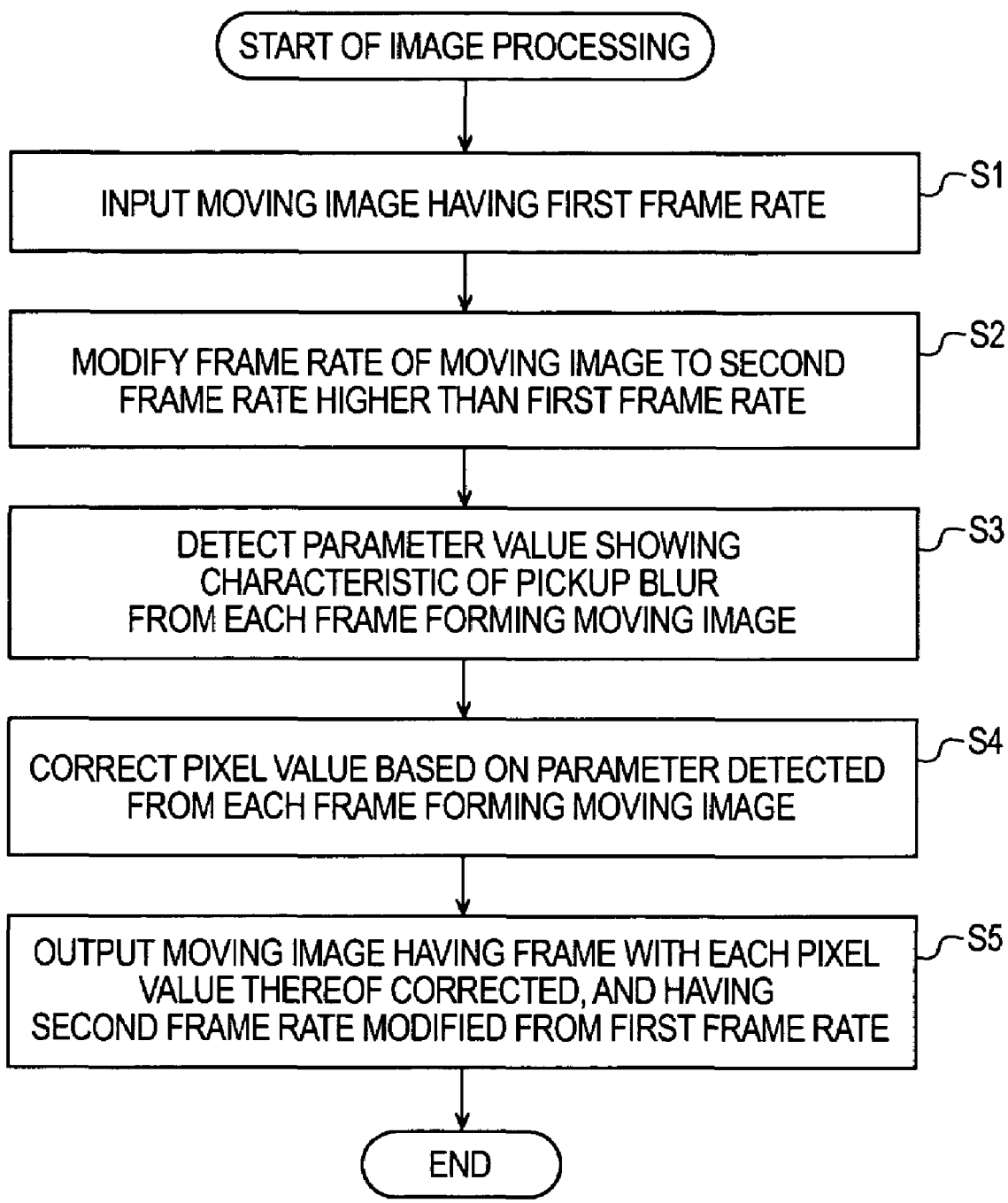
FIG. 3 is a flowchart illustrating an image processing operation performed by the image processing apparatus of FIG. 1.
Figure 13:
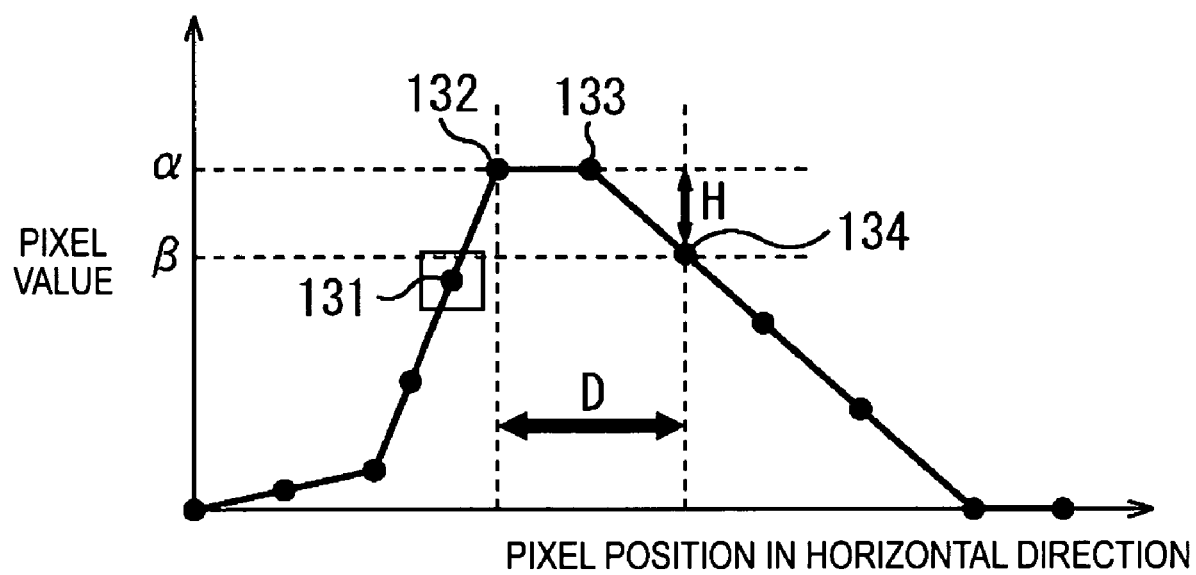
FIG. 13 illustrates a process of the ALTI module of FIG. 12 for correcting a pixel value when the mean pixel value of pixel values of a group of pixels consecutively lined on the right-hand side of a target pixel is calculated.

Each of the first mean value calculating unit and the second mean value calculating unit determines whether the polarity of the slope of a line is changing in the plane (for example, a plane of FIG. 13) defined by the first axis representing positions of the pixels and the second axis representing pixel values, the line connecting points (for example, a point 132, a point 133, and a point 134 of FIG. 13) respectively indicating the k input pixel values falling within the determined calculation range (for example, a range D of FIG. 13). If the polarity of the slope of the line is determined as being not changing, one of the first direction mean pixel value and the second direction mean pixel value is calculated using each of the k input pixel values. If the polarity of the slope of the line is determined as being changing, the input pixel value indicated by a point subsequent to the change in polarity, from among the k input pixel values (for example, a pixel value β indicated by the point 134 of FIG. 13), is corrected based on the input pixel value indicated by a point prior to the change in polarity (for example, a pixel value α indicated by the point 133 of FIG. 13) (for example, in accordance with equation (3) to be discussed later), and one of the first direction mean pixel value and the second direction mean pixel value is calculated using both the corrected input pixel values from among the k input pixel values (for example, as shown in FIG. 13, the pixel value of the pixel indicated by the point 134 being a pixel value γ=α subsequent to the correction in accordance with equation (3)), and the remaining uncorrected input pixel values (for example, as shown in FIG. 3, each of the pixel values α of the pixels of the points 132 and 133 being used as is). As shown in FIG. 13, the point 131 is the target point, and the pixel value α is calculated as the second direction mean pixel value.

Figure 5:
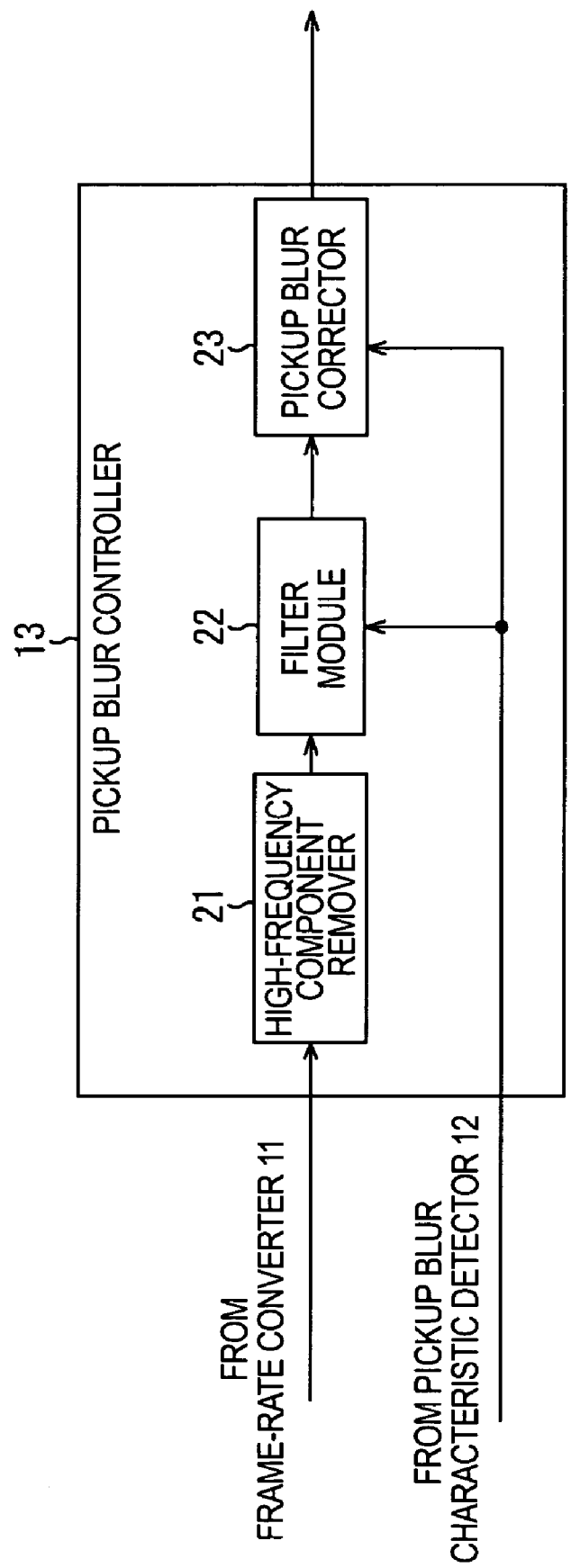
FIG. 5 is a functional block diagram of a pickup blur controller of the image processing apparatus of FIG. 1.
Figure 8:
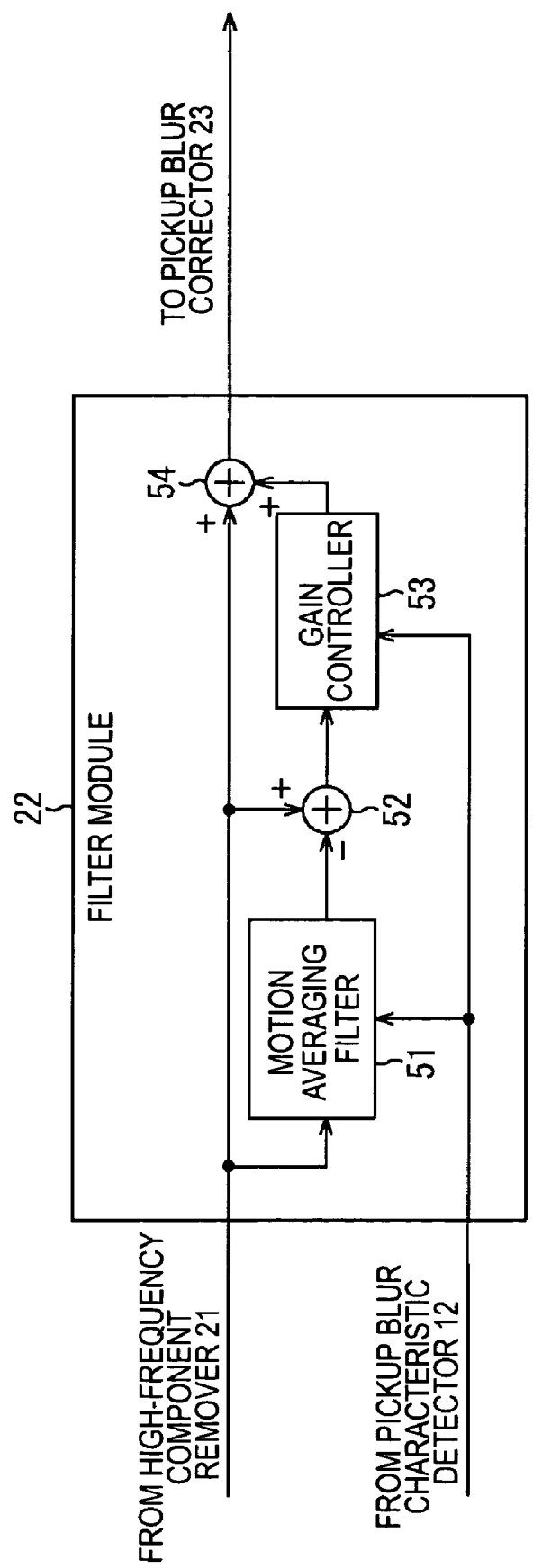
FIG. 8 is a functional block diagram of a filter module in the pickup blur controller of FIG. 5.

The corrector further includes a first corrector (for example, the pickup blur corrector 23 of FIG. 5 including the ALTI module 81 of FIG. 12) and a second corrector (for example, a filter module 22 of FIG. 5 having a structure shown in FIG. 8). The first corrector includes the acquisition unit, the first mean value calculating unit, the second mean value calculating unit, the correction value determination unit, and the first adding unit. The second corrector includes a motion averaging filtering unit (for example, a motion averaging filter 51 of FIG. 8) for converting characteristic of a motion averaging filter indicating the image blur, in response to the value of one of the parameter values corresponding to the target pixel (for example, converted into characteristics H2, H3, and H4 in a frequency domain), performing a motion averaging filtering operation featuring the converted characteristic, on each of input pixel values of pixels in a predetermined block containing the target pixel, and outputting, as a first value, the resulting corrected input pixel value of the target pixel, a subtractor unit (for example, a subtractor 52 of FIG. 8) for calculating a difference between the input pixel value of the target pixel and the first value output from the motion averaging filtering unit, and outputting the difference as a second value, and a second adding unit (for example, a adder 54 of FIG. 8) for adding the second value output from the subtractor unit to the input pixel value of the target pixel, and outputting the resulting sum as an output pixel value of the target pixel.

The image processing apparatus may further include a rate conversion unit (for example, a frame-rate converter 11 of FIG. 1) for performing a rate conversion operation converting a rate of the access unit in the moving image from a current first rate to a second rate higher than the first rate. The corrector corrects the pixel value of each of the plurality of pixels forming the access unit to be processed, before or after the rate conversion unit performs the rate conversion operation on the access unit to be processed (in the case of FIG. 1, after the rate conversion operation).

Another embodiment of the present invention relates to an image processing method of an image processing apparatus (image processing apparatus performing a process step in step S3 of FIG. 3) of acquiring, on a per access unit basis, a value of at least one parameter indicating characteristics of image blur taking place during the image pickup of a moving image by a predetermined image pickup device, a plurality of access units forming the moving image picked up by the image pickup device, or acquiring the parameter value from the outside. The image processing method includes a step of correcting a pixel value of each of a plurality of pixels forming each access unit to be processed, based on at least one of the parameter values corresponding to the access unit to be processed (for example, in step S4 of FIG. 3). The correcting step includes an acquisition substep of setting, as a target pixel, one of the plurality of pixels forming the access unit to be processed, and acquiring input pixel values of n pixels (n being an integer equal to or more than 3) consecutively arranged in a first direction centered on the target pixel (for example, in steps S21 and S22 of FIG. 15), a first mean value calculating substep of determining a calculation range of input pixel values of k pixels (k being an integer less than n/2) arranged further in the first direction than the target pixel from among the input pixel values acquired in the acquisition substep based the parameter value corresponding to the target pixel, and calculating, as a mean pixel value in the first direction, the mean value of the input pixel values falling within the calculation range (for example, in step S24 of FIG. 15), a second mean value calculating substep of determining a calculation range of input pixel values of k pixels arranged further in a second direction, opposed to the first direction, than the target pixel from among the input pixel values acquired in the acquisition substep based the parameter value corresponding to the target pixel, and calculating, as a mean pixel value in the second direction, the mean value of the input pixel values falling within the calculation range (for example, in step S25 of FIG. 15), a correction value determination substep of determining a correction value correcting the input pixel value of the target pixel based on the relationship of the first direction mean pixel value calculated in the first mean value calculating substep (for example, in steps S26 through S29 of FIG. 15), the input pixel value of the target pixel, the second direction mean pixel value calculated in the second mean value calculating substep, and an adding substep of adding the correction value determined in the correction value determination substep to the input pixel value of the target pixel, and outputting the resulting sum as an output pixel value of the target pixel (for example, in step S30 of FIG. 15).

In accordance with embodiments of the present invention, a computer program in accordance with the image processing method, and a recording medium storing the computer program are also provided. As will be described later, the computer program is stored in a removable recording medium 311 and a recording medium such as a hard disk included in a storage unit 308, and executed by a computer having a structure of FIG. 27.

The image processing apparatus of one embodiment of the present invention is used as part or whole of an entire television system. The television system herein refers to a system including at least one audio-visual apparatus including a television receiver.

The embodiments of the present invention are described below with reference to the drawings.

FIG. 1 is a functional block diagram of an image processing apparatus 1 of one embodiment of the present invention.

The image processing apparatus 1 performs a variety of image processing procedures on moving image data on a per access unit basis. The access unit refers to a unit of moving image, such as a frame or a field, and means part or whole of the entire frame forming the moving image. The frame herein refers to a single frame of still image. For simplicity of explanation, the image processing apparatus 1 performs a variety of image processing procedures on the moving image data on a per frame unit basis.

As shown in FIG. 1, the image processing apparatus 1 includes a frame-rate converter 11, a pickup blur characteristic detector 12, and a pickup blur controller 13.

The frame-rate converter 11 receives a moving image signal, such as a television broadcast signal as the moving image data on a per frame unit basis.

If there is no need for discriminating between the moving image and the moving image data thereof, these pieces of data are collectively referred to as the moving image. Similarly, if there is no need for discriminating between the frame and the frame data thereof, these pieces of data are collectively referred to as the frame.

Upon receiving the moving image at a first frame rate, the frame-rate converter 11 performs a high frame-rate conversion process on the input moving image, and supplies the pickup blur characteristic detector 12 and the pickup blur controller 13 with a resulting moving image having a second frame rate higher than the first frame rate.

The high frame-rate conversion process is performed when the input first frame rate is lower than the output second frame rate. A new frame is created and inserted between consecutive frames of the input moving image, and the moving image is thus converted into the second frame rate higher than the first frame rate.

The first frame rate refers to the frame rate of the moving image input to the frame-rate converter 11. The first frame rate can be any rate, and is typically an image pickup frame rate at which the moving image is picked up by an image pickup device (not shown).

The pickup blur characteristic detector 12 detects the value of a parameter indicating characteristics of pickup image blur on each frame forming the moving image supplied from the frame-rate converter 11. The detection results of the pickup blur characteristic detector 12, namely, the value of the parameter indicating the characteristics of the pickup blur, is fed to the pickup blur controller 13.

The parameter indicating the characteristics of the pickup blur is not limited to any particular one. The specific example of the parameter indicating the characteristics of the pickup image will be described later.

The number of parameters detected from one frame is not limited to any particular value. For example, one parameter value indicating the characteristics of the pickup blur can be detected from one frame or from each pixel forming the frame. Alternatively, one frame can be partitioned into several blocks, and one parameter value indicating the characteristics of the pickup blur can be detected on a per block basis.

In response to each frame forming the moving image supplied from the frame-rate converter 11, the pickup blur controller 13 corrects pixels forming the frame to be processed based on one of the parameter values, detected by the pickup blur characteristic detector 12, corresponding to the frame to be processed, in each frame forming the moving image supplied from the frame-rate converter 11. More specifically, the pickup blur controller 13 corrects the pixel value of the frame being processed to control the pickup blur in response to the characteristics of the pickup blur (the value of the parameter) in the frame to be processed.

The pixel value of each pixel forming the frame is corrected to result in the blur free moving image. The moving image having the second frame rate higher than the first frame rate is output external to the image processing apparatus 1 via the pickup blur controller 13.

As shown in FIG. 1, a combination of the pickup blur characteristic detector 12 and the pickup blur controller 13 is used together with the frame-rate converter 11. The combination can be separately used, or can be used together with another image processing functional block (not shown).

Only the combination of the pickup blur characteristic detector 12 and the pickup blur controller 13 can still serve the purpose of controlling the image blur. To achieve more image blur controlling effect, the frame-rate converter 11 is preferably used together with the combination of the pickup blur characteristic detector 12 and the pickup blur controller 13. The reason for this is described below.

When a moving image displayed on a display device (not shown) is focused on the human retina, a blur recognized by the human is a combination of a hold blur that occurs when the human tracks a moving object appearing in the moving image, and a pickup blur that occurs at the image pickup of the moving image.

The characteristics of the pickup blur is represented by a low-pass filtered signal as will be described later with reference to FIG. 4. The image signal affected by the pickup blur is equivalent to a low-pass filtered signal that is obtained by performing a low-pass filtering operation on a pickup image blur free image signal (i.e., an ideal image signal). The pickup blur affected image signal is thus more degraded in frequency characteristics than the image signal prior to the pickup blur. More specifically, the higher the frequency the more the gain of the pickup blur affected image signal drops in comparison with the image signal prior to pickup blur.

Likewise, the characteristics of the hold blur are also represented as a low-filtered signal. More specifically, the hold blur affected image signal is equivalent to a low-pass filtered version of the image signal prior to the hold blur (namely, the pickup blur affected image signal). The hold blur affected image signal suffers from a reduction in frequency characteristics in comparison with the image signal prior to the occurrence of the hold blur. More specifically, the higher the frequency the more the gain of the hold blur affected image signal drops in comparison with the hold blur free image signal. The hold blur occurs only when the display device is a fixed pixel hold type display device.

The hold blur can be controlled by performing the high frame-rate conversion process on the pickup blur affected image signal suffering from a reduction in frequency characteristics. Even if the high frame-rate conversion process is performed, the pickup blur remains unchanged. The purpose of controlling image blur on the human retina is only half achieved. This is discussed with reference to FIG. 2.

Figure 2:
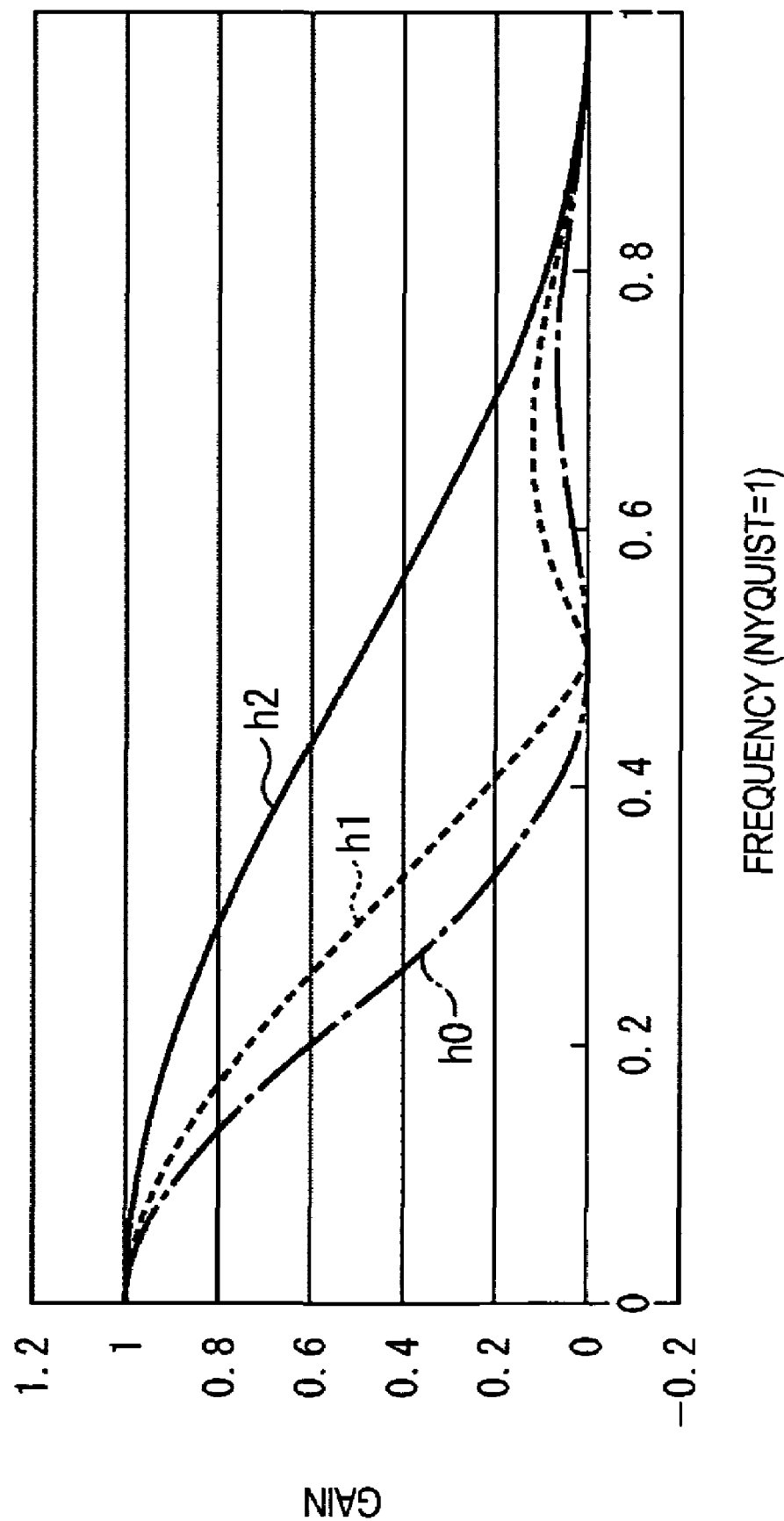
FIG. 2 illustrates a plot of frequency characteristics of an image blur formed on the human retina.

FIG. 2 illustrates frequency characteristics of blur of an image focused on the human retina when an image pickup device (hereinafter referred to as a camera) picks up an object moving at a motion speed 4 (4 pixels/frame) within an image pickup field. As shown in FIG. 2, the abscissa represents frequency, while the ordinate represents gain. The values plotted in the abscissa represent a relative value with Nyquist frequency at 1.

As shown in FIG. 2, a dot-and-dash chain curved line h0 represents frequency characteristics of the blur of an image formed on the human retina when a process for improving the blurs (including the pickup blur and the hold blur) is not performed. A moving image input to the image processing apparatus 1 of FIG. 1 is displayed on a display device without being processed in the image processing apparatus 1. When the human views such a moving image, the frequency characteristics of the blur of the image formed on the human retina are thus represented in accordance with the curved line h0.

If the high frame-rate conversion process doubles a display speed, only the hold blur is improved. As a result, the frequency characteristics of the blur of the image formed on the human retina are represented by a curved broken line h1. The frame-rate converter 11 performs the high frame-rate conversion process on the moving image input to the image processing apparatus 1 of FIG. 1, and the resulting moving image is then displayed on the display device without being input to the pickup blur controller 13 (for improving the pickup blur). The frequency characteristics of the blur of the image formed on the human retina are represented by a curved broken line h1.

If the display speed is doubled in the high frame-rate conversion process (with the hold blur being improved) and the degree of pickup blur is further half improved, the frequency characteristics of the image blur formed on the human retina become as represented by solid line h2 in FIG. 2. More specifically, the frame-rate converter 11 performs the high frame-rate conversion process on the moving image input to the image processing apparatus 1 of FIG. 1, and the pickup blur controller 13 controls the pickup blur of the moving image. The resulting moving image is displayed on a display screen. When the human views the moving image on the display screen, the frequency characteristics of the blur of the image formed on the human retina is represented by the curved line h2.

The curved line h1 is compared with the curved line h2. The improvement of the hold blur through the high frame-rate conversion process alone does not lead to sufficient level in blur characteristics on the human retina. Further pickup blur improvement is needed. The high frame-rate conversion process is conventionally simply performed without paying attention to the importance of improving the pickup blur.

Figure 23:
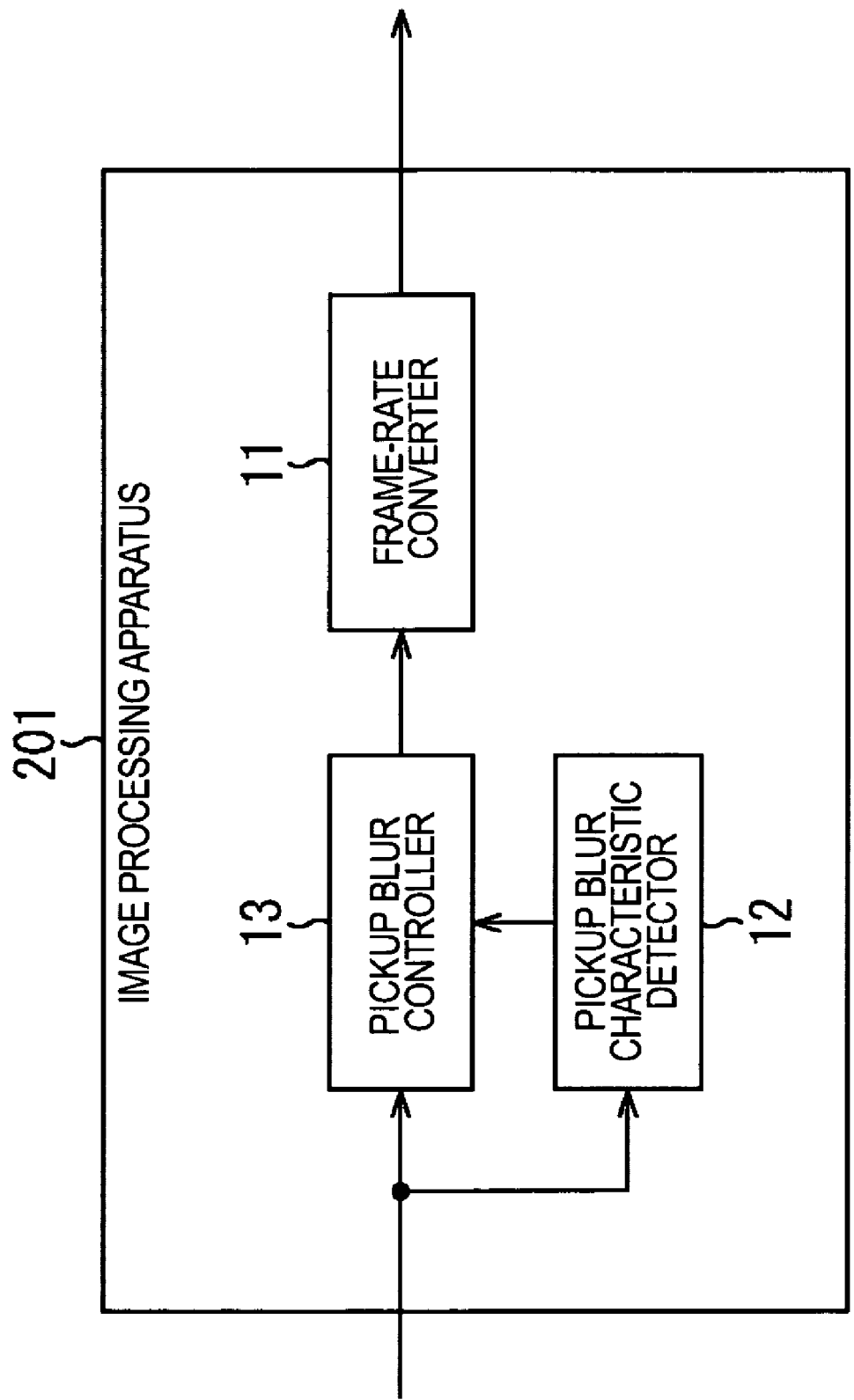
FIG. 23 is a functional block diagram of an image processing apparatus of another embodiment of the present invention, different from the image processing apparatus of FIG. 1.
Figure 24:
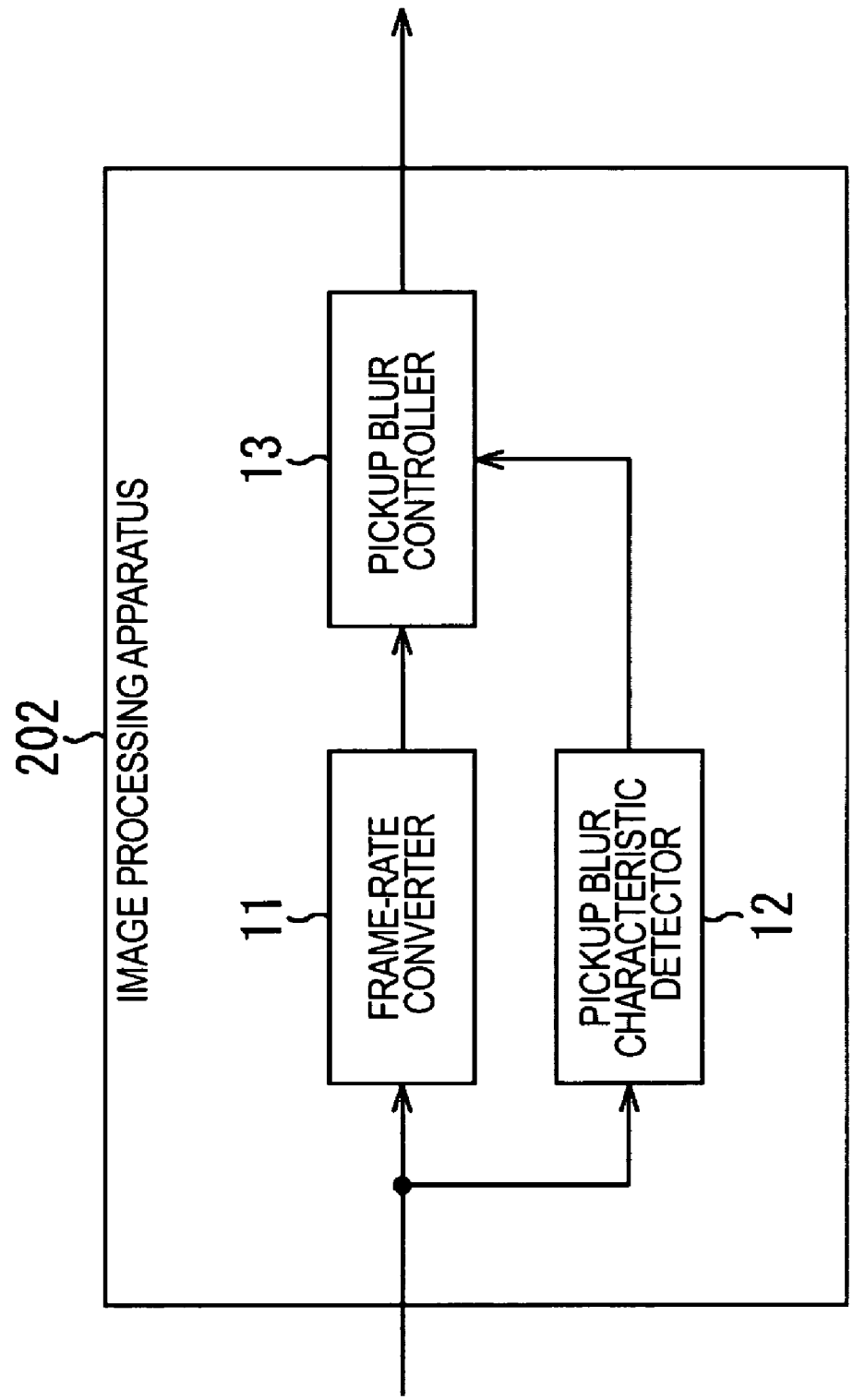
FIG. 24 is a functional block diagram of an image processing apparatus of yet another embodiment of the present invention, different from the image processing apparatuses of FIGS. 1 and 23.

Each of the image processing apparatuses of embodiments of the present invention shown in FIGS. 1, 23, and 24 further includes the pickup blur characteristic detector 12 and the pickup blur controller 13 in addition to the frame-rate converter 11 in order to improve the pickup blur. More specifically, the blue characteristics on the human retina are improved from the curved line h0 to the curved line h2 as shown in FIG. 2. The pickup blur characteristic detector 12 is not an essential element in the image processing apparatuses of the embodiments of the present invention as will be described with reference to FIGS. 25 and 26.

The pickup blur controller 13 corrects the pixel value of each pixel forming the frame to be processed, based on one of the parameter values, representing the pickup blur characteristics detected by the pickup blur characteristic detector 12 and corresponding to the frame to be processed. The pickup blur controller 13 thus controls image degradation due to the pickup blur on the frame subsequent to the high frame-rate conversion process. More specifically, a display device (not shown) is provided with an image signal output from the image processing apparatus such as the image processing apparatus 1. The display device thus displays a clear video with image degradation controlled.

The combination of the pickup blur characteristic detector 12 and the pickup blur controller 13 is appropriately used together with the frame-rate converter 11.

An image processing operation of the image processing apparatus 1 having the functional structure of FIG. 1 is discussed with reference to a flowchart of FIG. 3.

In step S1, the frame-rate converter 11 receives a moving image having a first frame rate.

In step S2, the frame-rate converter 11 converts the frame rate of the moving image from the first frame rate to a second frame rate higher than the first frame rate.

The moving image having the second frame rate is supplied from the frame-rate converter 11 to each of the pickup blur characteristic detector 12 and the pickup blur controller 13. Processing proceeds to step S3.

In step S3, the pickup blur characteristic detector 12 detects at least one parameter value representing the pickup blur characteristics from each of frames forming the moving image.

When at least one parameter value representing the pickup blur characteristics in each frame forming the moving image is supplied from the pickup blur characteristic detector 12 to the pickup blur controller 13, processing proceeds to step S4.

In step S4, the pickup blur controller 13 corrects the pixel value of each pixel forming the frame to be processed, based on at least one of the parameter values detected by the pickup blur characteristic detector 12, in each of the frames forming the moving image supplied from the frame-rate converter 11.

In step S5, the pickup blur controller 13 corrects the pixel value of each frame, and outputs the resulting moving image at the second frame rate higher than the first frame rate.

The image processing operation of FIG. 3 is thus completed.

In the above discussion, the process steps in steps Si through S5 are performed on the moving image as a unit of process for simplicity of explanation. In practice, however, the unit of process is frame in many cases.

In the image process of FIG. 3, the process unit at each step is the moving image. More specifically, step transition from one step to another from among steps S1 through S5 is performed on condition that any given step is completed on the entire moving image.

If the process unit is frame in the image process of FIG. 3, step transition from one step to another from among steps S1 through S5 is performed on condition that any given step is completed on the entire frame. In other words, if the process unit in each step is frame, a series of process steps from step S1 through S5 are performed in one frame independent of another (in parallel). For example, step S3 may be performed in a first frame while step S2 is performed in a second frame.

In practice, a pixel of interest (hereinafter referred to as a target pixel) is successively set from among pixels forming a frame to be processed, and at least steps S3 and S4 in succession are individually performed on the target pixel in many cases. In other words, the process unit of steps S3 and S4 is pixel.

In the following discussion, the process unit of steps S3 and S4 is pixel. More specifically, the process step in step S3 is performed by the pickup blur characteristic detector 12, and the process step in step S4 is performed by the pickup blur controller 13. The process unit of each of the pickup blur characteristic detector 12 and the pickup blur controller 13 is thus pixel.

The pickup blur controller 13 in the image processing apparatus 1 of FIG. 1 is described in detail below. More specifically, the process of the pickup blur controller 13 with the absolute value of a motion vector handled as a parameter representing the pickup blur characteristics is described below.

The absolute value of the motion vector is referred to as a motion speed, and the direction of the motion vector is referred to as a motion direction. The motion direction can be any direction in a two-dimensional plane. The image processing apparatus 1 can perform a variety of processes with the motion direction set at any direction in the two-dimensional plane. For simplicity of explanation, the motion direction is aligned with a horizontal direction.

If the motion speed is used as a parameter representing the pickup blur characteristics, the pickup blur characteristic detector 12 successively sets as a target pixel each of the pixels forming each frame to be processed, from out of the frames forming the moving image, detects successively the motion vector at each target pixel, and supplies the pickup blur controller 13 with the motion vector as the parameter value representing the pickup blur characteristics at the target pixel.

The pickup blur controller 13 successively sets, as the target pixel, each of the pixels forming each frame to be processed, from among the frames forming the moving image, and corrects the pixel value of the target pixel based on the motion speed at the target pixel supplied from the pickup blur characteristic detector 12.

The reason why the motion speed can serve as a parameter representing the pickup blur characteristics is described below.

The pickup blur characteristics are generally expressed in a form dependent on the motion speed of a subject.

When a camera photographs a subject, the subject itself may move in real space with the camera fixed. The motion speed of the subject includes a motion speed of the subject (image) moving in frames. When the subject fixed in real space is photographed, the camera is moved due to hand shaking. Furthermore, during photographing, both the subject and the camera can move in the real space. A relative motion speed of the subject within the real space occurs in such a case. Such speed is also contained in the motion speed.

The pickup blur characteristics are thus expressed in a form that depends on the motion speed of each of the pixels forming the image of the subject.

The motion speed of the pixel refers to a space distance between one pixel in a frame to be processed and the corresponding pixel in a prior frame. If the space distance between the pixel in the frame to be processed and the corresponding pixel in the immediately prior frame is v pixels (v is any integer equal to or larger than 0), the motion speed of that pixel is v pixels/frame.

If one of the pixels forming the image of the subject is set as a target pixel, the pickup blur characteristics of that target pixel are expressed in a form dependent on the magnitude of the motion speed v pixels/frame at the target pixel.

Figure 4:
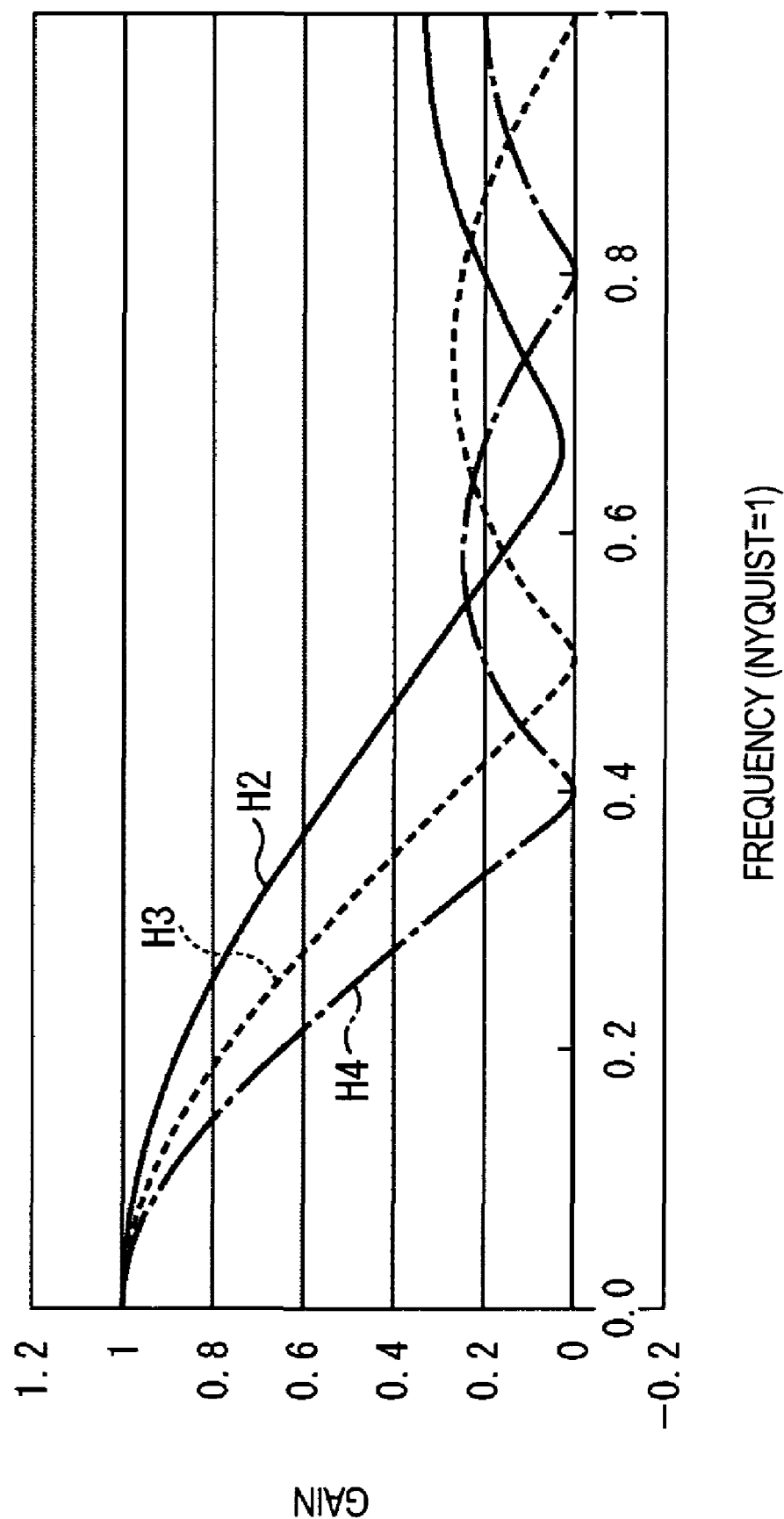
FIG. 4 illustrates a plot of frequency characteristics of a pickup blur responsive to a motion vector (motion speed)

More specifically, if the motion speeds of target pixels are 2, 3, and 4 pixels/frame, the pickup blur characteristics of the target pixels are represented by curved lines H2 through H4 respectively as shown in FIG. 4.

FIG. 4 shows a plot of the pickup blur characteristics of the target pixels having motion speeds of 2, 3, and 4 pixels/frame respectively. As shown in FIG. 4, the abscissa represents frequency while the ordinate represents gain. The values plotted along the abscissa are relative values with the Nyquist frequency at 1.

The reason why the motion speed can serve as a parameter representing the pickup blur characteristics has been discussed.

As the frequency characteristics H2 through H4 in FIG. 4 show, the pickup blur characteristics can be represented by motion averaging filter (low-pass filter) in space domain.

More specifically, let H represent the transfer function (of the pickup blur) representing the motion averaging filter (low-pass filter), F represent an ideal image signal free from pickup blur in a frequency domain (namely, a signal prior to the pickup blur), and h represent an image signal suffering from the pickup blur in a frequency domain (namely, an image signal subsequent to the pickup blur), and an image signal G subsequent to the pickup blur is expressed in equation (1) as follows:

$$G = H \times F \quad (1)$$

To remove the pickup blur, the signal F subsequent to the pickup blur is predictably calculated from the known signal G subsequent to the pickup blur and the known transfer function H of the pickup blur. A predictive calculation expressed in equation (2) is performed as follows:

$$F = \text{inv}(H) \times G \quad (2)$$

In equation (2), inv(H) is the inverse function of the transfer function H of the pickup blur. Since the transfer function H of the pickup blur has a low-pass filter feature, the inverse function inv(H) has a high-pass filter feature.

As described above, the transfer function H of the pickup blur varies the characteristics thereof in response to the motion speed. More specifically, the frequency characteristics of the transfer function H of the pickup blur at the target pixels having the motion speeds of 2, 3, and 4 pixels/frame are unique as represented by the curved lines H2, H3, and H4 as shown in FIG. 4.

The pickup blur controller 13 modifies the characteristics of the transfer function H of the pickup blur in response to the motion speed, and determines the inverse function inv(H) of the transfer function H having the modified characteristics. Using the inverse function inv(H), the pickup blur controller 13 performs an arithmetic process represented by equation (2). The pickup blur controller 13 thus removes (controls) the pickup blur.

The arithmetic process represented by equation (2) is performed in the frequency domain. To control the pickup blur, the pickup blur controller 13 can perform, in the space domain, a process equivalent to the arithmetic process represented by equation (2). More specifically, the pickup blur controller 13 can perform the following first through third processes.

In the first process, the pickup blur controller 13 converts the characteristics of the motion averaging filter (low-pass filter) representing the pickup blur at the target pixel in response to the motion speed at the target pixel supplied from the pickup blur characteristic detector 12. More specifically, a motion averaging filter is prepared for each of a plurality of motion speeds, and one of the motion averaging filters corresponding to the motion speed of the target pixel is selected.

The second process includes processes 2-1 through 2-3.

In the process 2-1, Fourier transform is performed on the motion averaging filter having the characteristics converted in the first process to present the motion averaging filter in frequency domain. More specifically, the curved lines H2, H3, and H4 shown in FIG. 4 are obtained for the target pixels having the motion speeds of 2, 3, and 4 pixels/frame, respectively. If considered in the frequency domain, the process 2-1 is performed to determine the transfer function H of the pickup blur at each target pixel.

In the process 2-2, the inverse of the motion averaging filter represented in frequency domain in the process 2-1 is calculated. If considered in the frequency domain, the process 2-2 is performed to generate the inverse function inv(H) of the transfer function H of the pickup blur as represented in equation (2).

In the process 2-3, the inverse Fourier transform is performed on the inverse of the motion averaging filter represented in the frequency domain, calculated in the process 2-2. More specifically, in the process 2-3, a high-pass filter (Wiener filter) corresponding to the inverse function inv(H) is generated. In other words, an inverse filter of the motion averaging filter is generated. The high-pass filter generated in the process 2-3 is referred to as an inverse motion averaging filter.

In the third process, an image signal g in the space domain corresponding to the signal G of equation (2) in the frequency domain subsequent to the pickup blur is input. The input image signal g is then subjected to the filter operation of the inverse motion averaging filter generated in the process 2-3. In the third process, an image signal f in the space domain corresponding to the signal F of equation (2) in the frequency domain prior to the pickup blur is restored (predictively calculated). More specifically, a predetermined block containing the target pixel in the frame to be processed is subjected to the filtering operation of the inverse motion averaging filter. The pixel value of the target pixel is thus corrected in the third process.

One embodiment of the pickup blur controller 13 performing the first through third processes is disclosed in FIG. 5 in Japanese Patent Application 2004-234051 assigned to the same assignee of this invention.

The pickup blur controller 13 having the arrangement disclosed in FIG. 5 in Japanese Patent Application 2004-234051 suffers from another drawback. As shown in the frequency characteristics H2 through H4 in FIG. 4, the motion averaging filter representing pickup blur (and the frequency characteristics thereof) contains a frequency resulting in a gain of 0. For this reason, the pickup blur controller 13 has difficulty in generating a complete inverse filter (a complete inverse averaging filter) of the motion averaging filter. As a result, noise is increased. This is a first drawback.

The third process to apply a high-pass filter (inverse motion averaging filer) to the image signal means a process to sharpen an edge of the filter. Known image forming techniques available to sharpen the edge of the filter includes techniques called "LTI (luminance transient improvement)" and "sharpness". Such known techniques can be applied to the pickup blur controller 13.

If such known techniques are applied to the pickup blur controller 13, new second through fifth drawbacks arise.

The technique "LTI" is disclosed in Japanese Unexamined Patent Application Publication No. 2000-324364. In accordance with Japanese Unexamined Patent Application Publication No. 2000-324364, luminance (pixel value) of a target pixel is replaced with luminance (pixel value) of a pixel adjacent to the target pixel to correct the luminance of the target pixel. As a result, an edge is sharpened. However, the LTI technique is not robust against noise, and a resulting processed image can be destroyed in response to noise. This is the second drawback. All edges are sharpened without taking into consideration image data prior to the application of the LTI technique.

The known techniques "LTI" and "sharpness" are used in image processing. In the fourth drawback, a still image free from pickup blur is equally processed as a pickup blur affected still image. In the fifth drawback, the known technique is uniformly applied regardless of the degree of pickup blur.

The inventors of this invention have thus developed the pickup blur controller 13 having the function structure of FIG. 5. FIG. 5 is a functional block diagram of the pickup blur controller 13.

As shown in FIG. 5, the pickup blur controller 13 includes a high-frequency component remover 21, a filter module 22 and a pickup blur corrector 23.

In the description of the pickup blur controller 13, the signal input to blocks (including an arithmetic unit such as an adder) forming the pickup blur controller 13 is generally referred to as an input signal rather than as an input signal unit such as a moving image, a frame forming each frame, and the pixel value of each pixel forming each frame. Similarly, a signal output from each functional block in the pickup blur controller 13 is generally referred to as an output signal rather than as an output signal unit. In other words, if the use of the input signal unit and the output signal unit is required, the unit based name (such as a pixel value) is used; otherwise, the input signal and the output signal are simply used.

As shown in FIG. 5, the output signal from the frame-rate converter 11, as an input signal to the pickup blur controller 13, is fed to the high-frequency component remover 21. The output signal from the pickup blur characteristic detector 12 is supplied to each of the filter module 22 and the pickup blur corrector 23. The output signal of the high-frequency component remover 21 is supplied to the filter module 22. The output signal of the filter module 22 is supplied to the pickup blur corrector 23. The output signal of the pickup blur corrector 23 is output as a final output signal of the pickup blur controller 13.

The high-frequency component remover 21, the filter module 22, and the pickup blur corrector 23 are successively discussed in detail.

The high-frequency component remover 21 is discussed in detail with reference to FIGS. 6 and 7.

Figure 6:
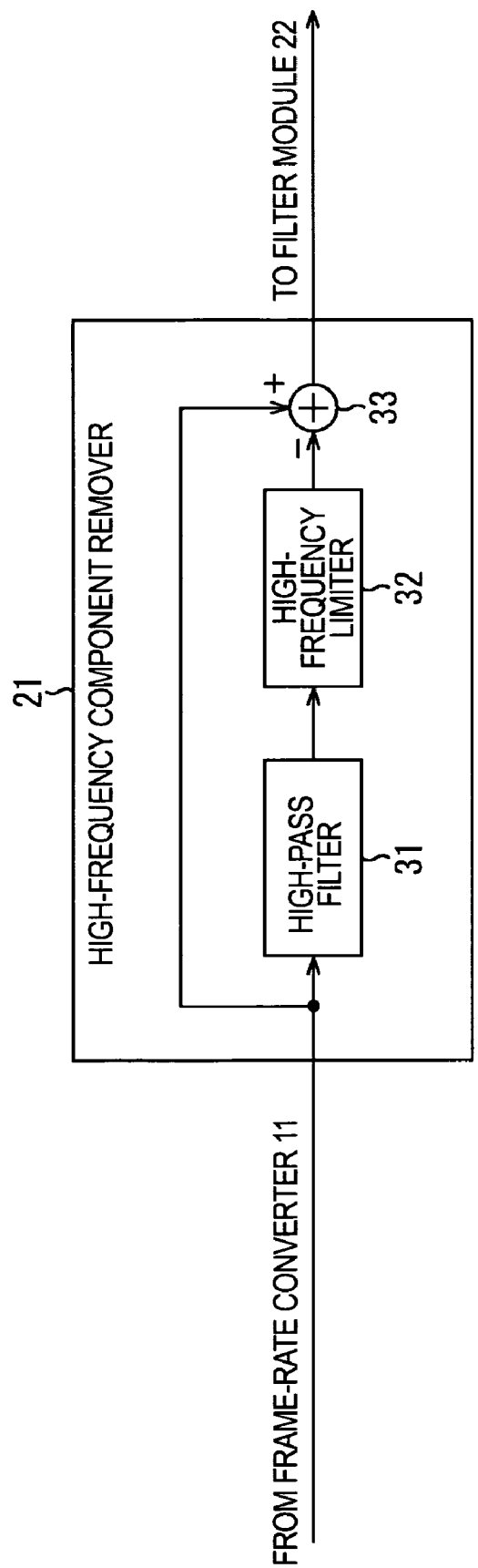
FIG. 6 is a functional block diagram of a high-frequency component remover of the pickup blur controller of FIG. 5.

FIG. 6 is a functional block diagram of the high-frequency component remover 21. FIG. 7 is a plot of characteristics of a high-frequency limiter 32 of the high-frequency component remover 21 of FIG. 6.

As shown in FIG. 6, the high-frequency component remover 21 includes a high-pass filter 31, a high-frequency limiter 32, and a subtractor 33.

As shown in FIG. 6, the output signal of the frame-rate converter 11, as an input signal to the high-frequency component remover 21, is fed to each of the high-pass filter 31 and the subtractor 33.

The high-pass filter 31, having a function of a high-pass filter, thus extracts a high-frequency component from the signal input to the high-frequency component remover 21, and supplies the high-frequency component to the high-frequency limiter 32.

Figure 7:
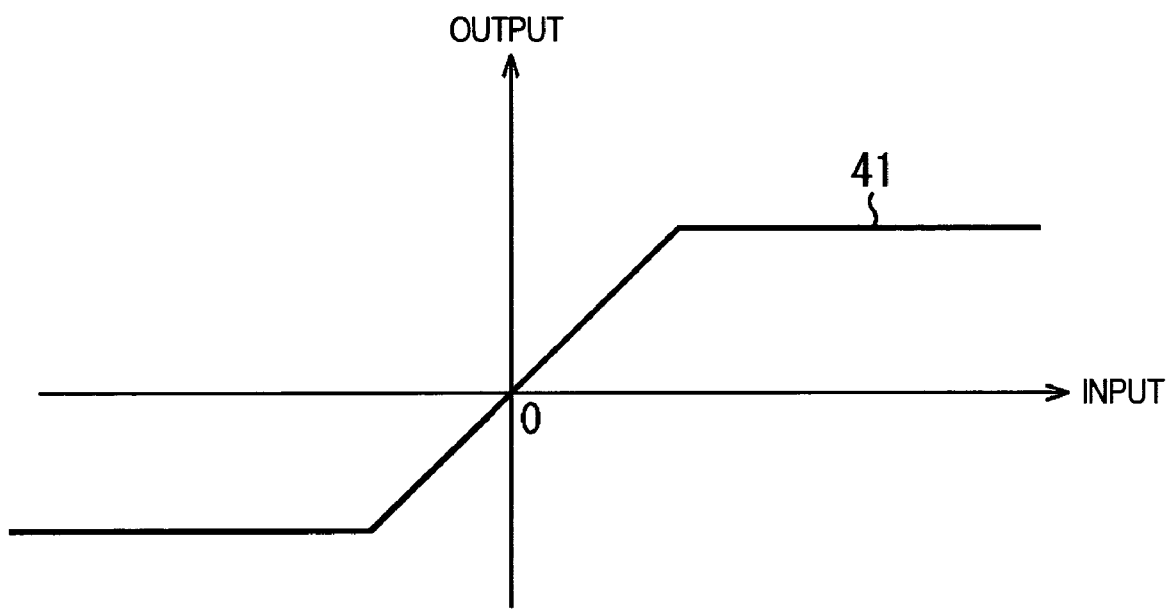
FIG. 7 is a plot of characteristics of a high-frequency limiter of the high-frequency component remover of FIG. 6.

The high-frequency limiter 32 has a function represented by a broken line 41 of FIG. 7. The high-frequency component supplied from the high-pass filter 31 is applied to the function as an input parameter, and the output of that function (output of FIG. 7) is supplied to the subtractor 33. As the broken line 41 of FIG. 7 clearly shows, the high-frequency limiter 32 limits the input high-frequency component supplied from the high-pass filter 31 if the input high-frequency component is below a constant value or above a constant value. In other words, the high-frequency limiter 32 provides the characteristics as represented by the broken line 41 of FIG. 7.

Returning to FIG. 6, the subtractor 33 calculates a difference between the input signal to the high-frequency component remover 21 and the high-frequency component limited by the high-frequency limiter 32, and supplies the resulting difference signal to the filter module 22 as an output signal of the high-frequency component remover 21.

The high-frequency component remover 21 removes the high-frequency component such as noise from the input signal, and supplies the resulting signal to the filter module 22 as an output signal.

The filter module 22 is described in detail with reference to FIGS. 8 through 10.

FIG. 8 is a detailed functional block diagram of the filter module 22. FIG. 9 is a detailed functional block diagram of a gain controller 53 of the filter module 22 of FIG. 8. FIG. 10 is a plot of characteristics of an adjustment value determiner 64 of the gain controller 53 of FIG. 9.

As shown in FIG. 8, the filter module 22 includes a motion averaging filter 51 through an adder 54.

As shown in FIG. 8, the output signal from the high-frequency component remover 21, as an input signal to the filter module 22, is supplied to each of the motion averaging filter 51, the subtractor 52, and the adder 54. The output signal from the pickup blur characteristic detector 12 is supplied to each of the motion averaging filter 51 and the gain controller 53.

The motion averaging filter 51 performs a filtering process on the input signal to the filter module 22 to average motion. More specifically, the motion averaging filter 51 performs a motion averaging filter operation on the pixel value of each of pixels forming a predetermined block containing a target pixel in a frame to be processed, out of the input signal to the filter module 22. The motion averaging filter 51 thus corrects the pixel value of the target pixel. In this process, the motion averaging filter 51 converts the characteristics of the motion averaging filter in response to the motion speed of the target pixel of the output signal from the pickup blur characteristic detector 12. More specifically, if the motion speeds of the target pixels are 2, 3, and 4 pixels/frame, the motion averaging filter 51 converts the characteristics thereof to the characteristics represented by the curved lines H2, H3, and H4 of FIG. 4 in the frequency domain as previously discussed. The pixel value of the target pixel corrected by the motion averaging filter 51 is supplied to the subtractor 52.

The subtractor 52 determines a difference between a pre-correction pixel value of the target pixel of the input signal to the filter module 22 and the pixel value of the target pixel corrected by the motion averaging filter 51, and supplies the resulting difference value to the gain controller 53. The output signal from the subtractor 52 is referred to as a before-and-after motion averaging filtering difference.

The gain controller 53 adjusts the before-and-after motion averaging filtering difference, and supplies the adjusted difference as an output signal to the adder 54. The gain controller 53 will be described in detail later with reference to FIG. 9.

The adder 54 adds the input signal to the filter module 22 to the output signal from the gain controller 53, and supplies the sum signal as an output signal to the pickup blur corrector 23. More specifically, the adder 54 adds, to the pixel value of the target pixel prior to correction, the before-and-after motion averaging filtering difference as the adjustment value, and supplies the resulting sum as the corrected pixel value of the target pixel to the external pickup blur corrector 23.

The above-referenced process of the filter module 22 performed in the space domain is considered in the frequency domain as below.

If the before-and-after motion averaging filtering difference as the output signal of the subtractor 52 is considered in the frequency domain, gain of the output signal of the subtractor 52 at a frequency of interest is analyzed below. At the frequency of interest, a gain difference between gain of the input signal of the filter module 22 and gain of the input signal having passed through the motion averaging filter 51 becomes the gain of the output signal of the subtractor 52. The gain of the output signal of the subtractor 52 is referred to as a before-and-after motion averaging filtering gain difference.

The before-and-after motion averaging filtering gain difference is adjusted by the gain controller 53. The gain adjustment will be described later.

If the output signal of the filter module 22 (adder 54) of FIG. 8 is considered in the frequency domain, the gain of the output signal at a frequency of interest is a sum gain that is obtained by summing the gain of the input signal to the adder 54 and the before-and-after motion averaging filtering gain difference subject to the gain adjustment. At each frequency, the gain of the output signal is raised from the gain of the input signal by the before-and-after motion averaging filtering gain difference subsequent to the gain adjustment.

In other words, the entire filter module 22 performs a process basically equivalent to a high-pass filtering process.

Figure 9:
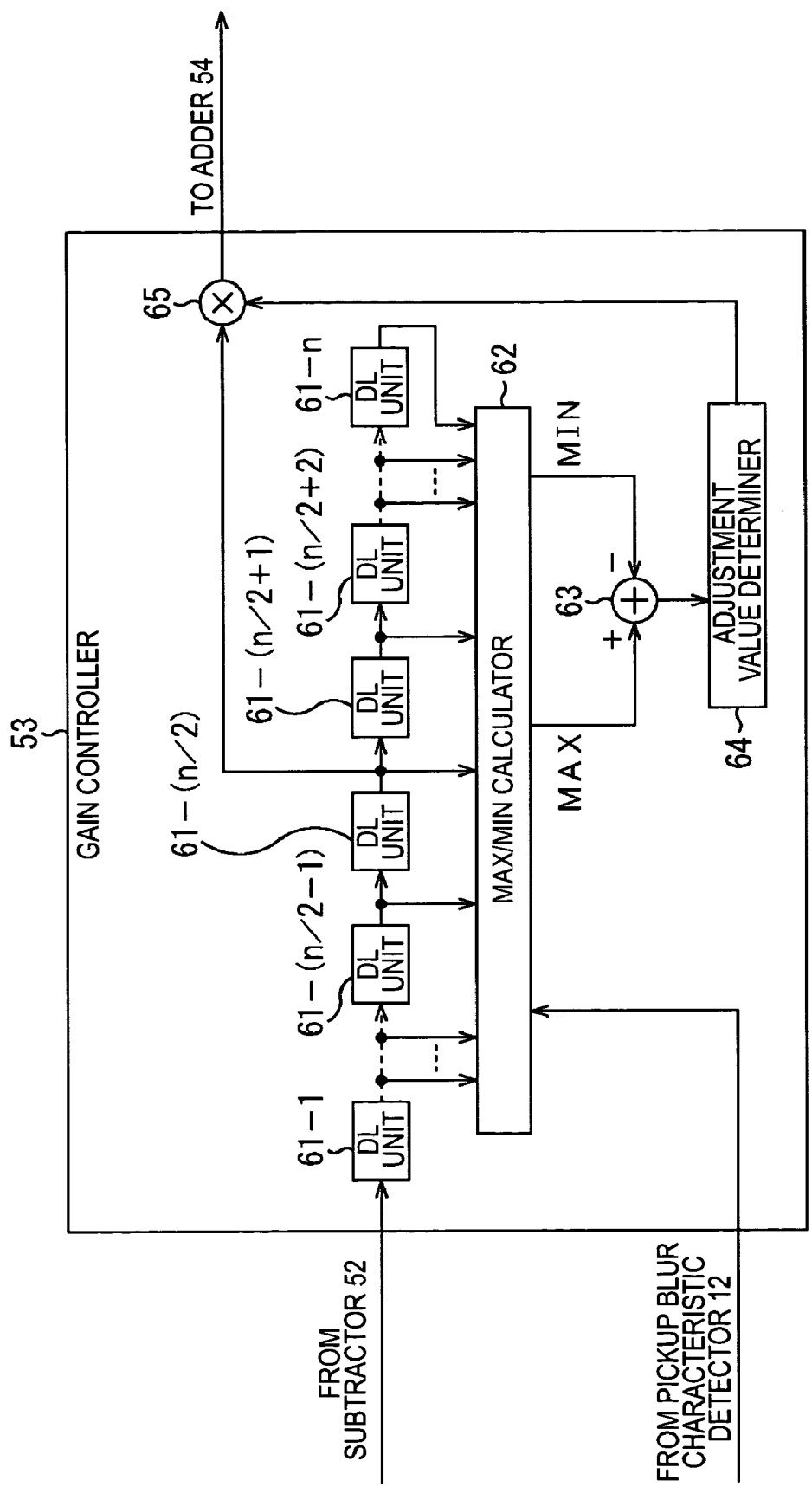
FIG. 9 is a functional block diagram of a gain controller of the filter module of FIG. 8.

Referring to FIG. 9, the gain controller 53 is described in detail below.

As shown in FIG. 9, the gain controller 53 includes delay units 61-*l* through 61-*n* (hereinafter referred to as DL 61-*l* through DL 61-*n*), a maximum/minimum (MAX/MIN) calculator 62, a subtractor 63, an adjustment value determiner 64, and a multiplier 65.

As shown in FIG. 9, the before-and-after motion averaging filtering gain difference as the output signal of the subtractor 52 is supplied to the DL unit 61-*l* as an input signal to the gain controller 53. The output signal from the pickup blur characteristic detector 12 is supplied to the MAX/MIN calculator 62.

The gain controller 53 thus constructed controls ringing that could occur in a high-signal level region.

The functional structure (connection configuration of blocks) and the operation of the gain controller 53 are described below.

The DL unit 61-*l* through the DL unit 61-*n* are connected in that order a cascade fashion. When one delay unit receives the output signal from a prior delay unit, the delay unit delays the input signal by a predetermined delay time, and supplies the delayed signal as an output signal thereof to a subsequent delay unit. The output signal of each of the DL unit 61-*l* through the DL unit 61-*n* is also supplied to the MAX/MIN calculator 62. The output signal of the DL unit 61-*n*/2 is also supplied to the multiplier 65.

From among the before-and-after motion averaging filtering gain differences as the input signals to the gain controller 53, values (hereinafter referred to as before-and-after pixel value differences) respectively corresponding to n pixels centered on the target pixel and consecutively lined in the motion direction (horizontal direction herein) are successively input to the DL unit 61-*l* in the order of pixel arrangement from right to left. If time equal to n times the delay time has elapsed, the DL unit 61-*l* through the DL unit 61-*n* output the before-and-after pixel value differences respectively corresponding to n pixels centered on the target pixel and consecutively lined in the motion direction to the MAX/MIN calculator 62. The before-and-after pixel value difference of the target pixel, output from the DL unit 61-*n*/2, is supplied to the MAX/MIN calculator 62 and the multiplier 65.

The number "n" of the DL unit 61-*l* through the DL unit 61-*n*, not limited to any particular number, is the maximum motion speed "pixels/frame". The motion speed of the target pixel supplied from the pickup blur characteristic detector 12 is v pixels/frame. Herein, v is any integer equal to or greater than 0.

The MAX/MIN calculator 62 determines, as a calculation range, a range containing the before-and-after pixel value differences of v pixels having the motion speed v of the target pixel as the center of the range. The MAX/MIN calculator 62 determines a maximum value MAX and a minimum value MIN from the v before-and-after pixel value differences contained in the calculation range from the n before-and-after pixel value differences supplied from the DL unit 61-*l* through the DL unit 61-*n*, and supplies the maximum value MAX and the minimum value MIN to the subtractor 63.

The reason why the range of the before-and-after pixel value differences of v pixels having the motion speed v of the target pixel as the center thereof is selected as the calculation range is that ringing affects the number of taps of the high-pass filters, in other words, the motion speed.

The subtractor 63 calculates a difference between the maximum value MAX and the minimum value MIN supplied from the MAX/MIN calculator 62, and supplies the difference value (=MAX-MIN) to the adjustment value determiner 64.

The larger the difference value (MAX-MIN), the larger the ringing in the vicinity of the target pixel becomes. The difference value (MAX-MIN) serves an indicator of the size of the ringing in the vicinity of the target pixel.

In response to the difference value (MAX-MIN) supplied from the subtractor 63, the adjustment value determiner 64 determines the adjustment value for the before-and-after pixel value difference of the target pixel, and supplies the adjustment value to the multiplier 65.

Figure 10:
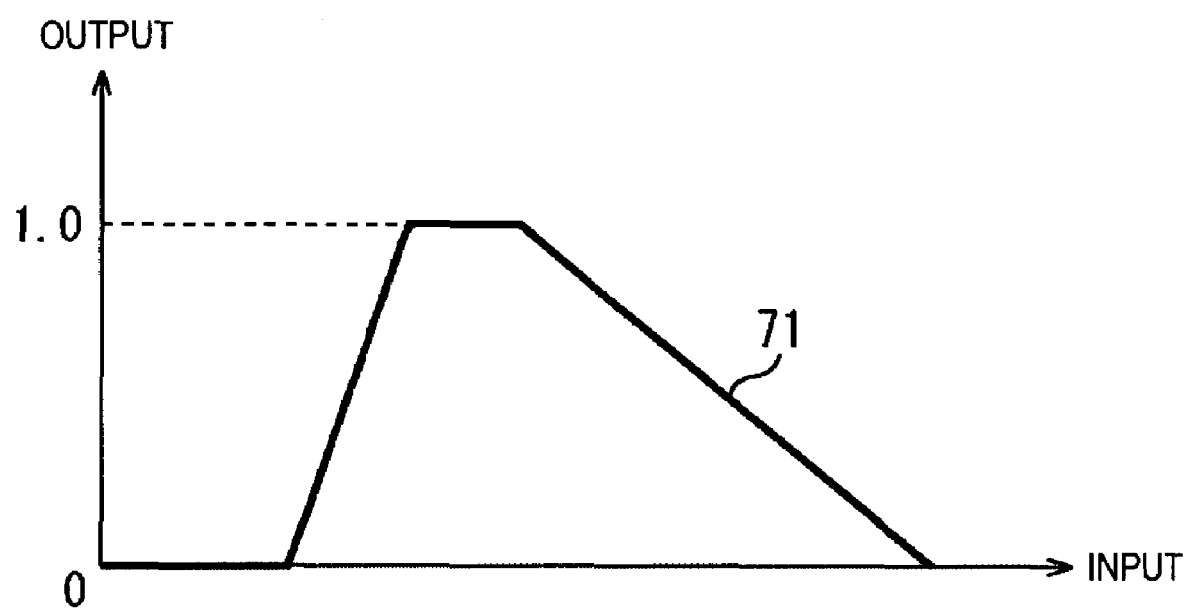
FIG. 10 illustrates characteristics of an adjustment value determiner of the gain controller of FIG. 9.

More specifically, the adjustment value determiner 64 holds the function indicated by a broken line 71 of FIG. 10, and applies the difference value (MAX-MIN) supplied from the subtractor 63, as a parameter, to the function, and supplies the output of the function (output of FIG. 10) to the multiplier 65 as the adjustment value to the before-and-after pixel value difference of the target pixel. As the shape of the broken line 71 of FIG. 10 clearly shows, if the difference value (MAX-MIN) supplied from the subtractor 63 exceeds a constant value, an adjustment value (output) decreases to control the generation of ringing. The adjustment value determiner 64 has thus the characteristics represented by the broken line 71 of FIG. 10.

Returning to FIG. 9, the multiplier 65 multiplies the before-and-after pixel value difference of the target pixel supplied from the DL unit 61-(*n*/2) by the adjustment value (falling within a range from 0 to 1 as shown in FIG. 10) supplied from the adjustment value determiner 64, and supplies the product to the adder 54 as the before-and-after pixel value difference of the target pixel subsequent to the adjustment. The before-and-after pixel value difference of each pixel subject to the adjustment is successively supplied to the adder 54 as the output signal of the gain controller 53.

If the difference value (MAX-MIN) as the output signal of the subtractor 63 exceeds the constant value, and becomes larger, the adjustment value (output) gradually decreases to 1 or 0. If the difference value (MAX-MIN) as the output of the subtractor 63 is above the constant value, the before-and-after pixel value difference of the target pixel is multiplied by an adjustment value less than 1. As a result, the before-and-after pixel value difference of the target pixel becomes smaller. The ringing in the vicinity of the target pixel is thus controlled.

The process of the gain controller 53 in the space domain is thus equivalent to a frequency-domain gain adjustment process performed on the before-and-after motion averaging filtering gain difference to control ringing.

The pickup blur corrector 23 is described below with reference to FIGS. 11 through 19.

Figure 11:
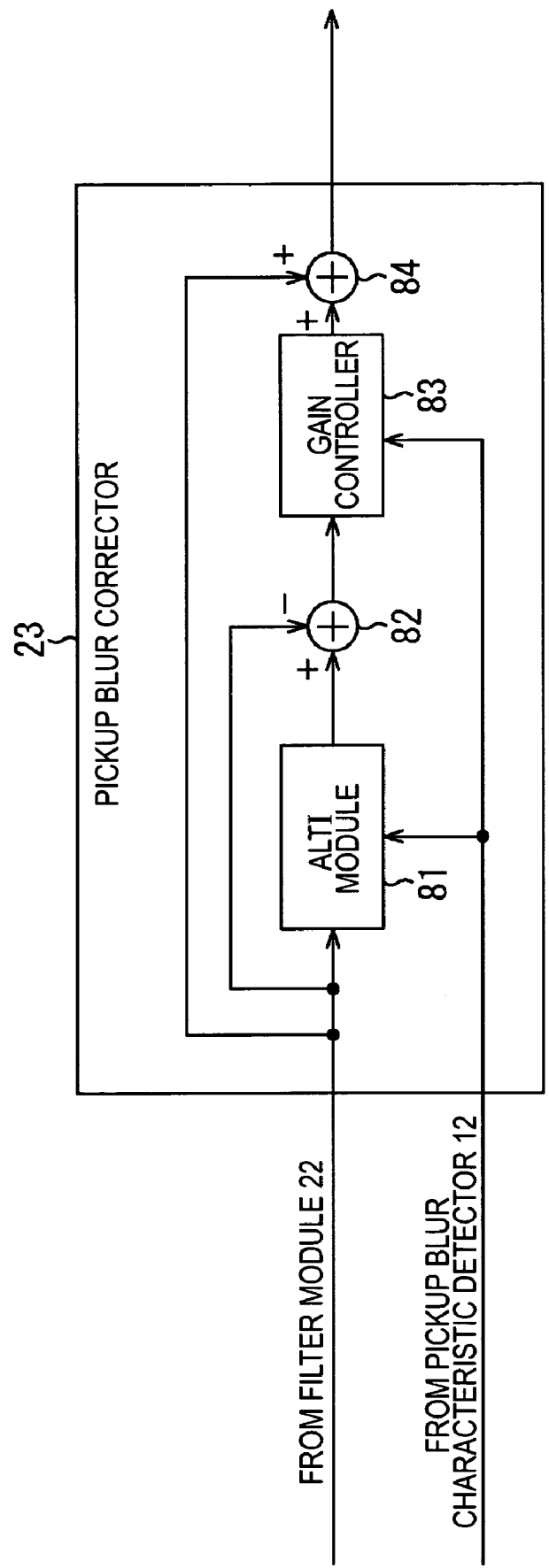
FIG. 11 is a functional block diagram of a pickup blur corrector in the pickup blur controller of FIG. 5.

FIG. 11 is a detailed functional block diagram of the pickup blur corrector 23.

As shown in FIG. 11, the pickup blur corrector 23 includes an ALTI module 81, a subtractor 82, a gain controller 83, and an adder 84.

As shown in FIG. 11, the output of the filter module 22 is input to each of the ALTI module 81, the subtractor 82, and the adder 84 as an input signal to the pickup blur corrector 23. The output signal of the pickup blur characteristic detector 12 is supplied to each of the ALTI module 81 and the gain controller 83.

The process of each of ALTI module 81 through the adder 84 performed on the pixel value of the target pixel of the input signal to the pickup blur corrector 23 is described below.

The pixel value of the target pixel supplied to the pickup blur corrector 23 is already corrected by the high-frequency component remover 21 and the filter module 22, and is typically different from the pixel value input to the pickup blur controller 13 of FIG. 5. As will be discussed later, the pixel value of the target pixel is appropriately corrected in the pickup blur corrector 23. For simplicity of explanation, the pixel value input to each block in the pickup blur corrector 23 is referred to as an input pixel value while the pixel vale output from each block in the pickup blur corrector 23 is referred to as an output pixel value. One of the functional blocks receives a plurality of different pixel values of the same pixel from a plurality of prior functional blocks. In such a case, a pixel value closer to the original pixel value (mainly, a pixel value prior to correction) is referred to as an input pixel value, and the other pixel values are referred to as an output pixel value of a subsequent function block. For example, the subtractor 82 receives the different pixel values of the target pixel from the ALTI module 81 and the filter module 22. The pixel value input from the filter module 22 is referred to as an input pixel value while the pixel value input from the ALTI module 81 is referred to as an output pixel value from the ALTI module 81.

The ALTI module 81 determines the correction value in response to the motion speed of the target pixel supplied from the pickup blur characteristic detector 12, adds the correction value to the input pixel value of the target pixel, and supplies the resulting sum to the subtractor 82 as the output pixel value of the target pixel. The ALTI module 81 will discussed further with reference to FIG. 12.

The subtractor 82 calculates a difference between the output pixel value of the target pixel of the ALTI module 81 and the input pixel value of the target pixel, and supplies the resulting difference (hereinafter referred to as a target pixel difference value) to the gain controller 83.

The gain controller 83 adjusts the target pixel difference value from the subtractor 82 in response to the motion speed of the target pixel supplied from the pickup blur characteristic detector 12, and supplies the adjusted target pixel difference value to the adder 84 as a final correction value of the target pixel.

The adder 84 adds, to the input pixel value of the target pixel, the final correction value from the gain controller 83, and outputs the resulting sum to the outside as the finally corrected pixel value of the target pixel.

The ALTI module 81 and the gain controller 83 in the pickup blur corrector 23 are described below in more detail in that order.

The ALTI module 81 is described in detail with reference to FIGS. 12 through 17.

FIG. 12 is a detailed functional block diagram of the ALTI module 81.

As shown in FIG. 12, the ALTI module 81 includes delay units 91-$l$ through 91-$n$ (hereinafter referred to as DL unit 91-$l$ through DL unit 91-$n$), mean value calculators 92 through 94, a correction value determiner 95, and an adder 96.

The functional structure (namely, connection configuration of functional blocks) and the operation of the ALTI module 81 are described below.

The DL unit 91-$l$ through the DL unit 91-$n$ are connected in a cascade in that order. When one delay unit receives the output signal from a prior delay unit, the delay unit delays the input signal by a predetermined delay time, and supplies the delayed signal as an output signal to a subsequent delay unit. The pixel value of each of the DL unit 91-$l$ through the DL unit 91-($n$/2−1) is also supplied to the mean value calculator 93. Pixel values respectively output from the DL unit 91-($n$/2−1), the DL unit 91-($n$/2) and the DL unit 91-($n$/2+1) are supplied to the mean value calculator 92. Pixel values output from the DL unit 91-($n$/2+1) through the DL unit 91-$n$ are supplied to the mean value calculator 94. The pixel value output from the DL unit 91-($n$/2) is also supplied to each of the correction value determiner 95 and the adder 96.

Pixel values of n pixels centered on the target pixel and consecutively lined in a motion direction (horizontal direction herein) are input from the filter module 22 to the DL unit 91-$l$ in the arrangement order of pixels from right to left. If time equal to n times the delay time has elapsed, the DL unit 91-$l$ through the DL unit 91-$n$ respectively output the pixel values of the n pixels consecutively arranged centered on the target pixel in the horizontal direction.

In the following discussion, the pixel value output at each stage of the DL unit 91-$l$ through the DL unit 91-$n$ is referred to as an input pixel value to the ALTI module 81.

More specifically, the DL unit 91-($n$/2) outputs an input pixel value N of the target pixel. Input pixel values of n/2−1 pixels consecutively arranged on the left hand side of the target pixel are respectively output from the DL unit 91-$l$ through the DL unit 91-($n$/2−1). Input pixel values of n/2−1 pixels consecutively arranged on the right hand side of the target pixel are respectively output from the DL unit 91-($n$/2+1) through the DL unit 91-$n$.

The number "n" of the DL unit 91-$l$ through the DL unit 91-$n$, not limited to any particular number, is the maximum motion speed "pixels/frame". The motion speed of the target pixel supplied from the pickup blur characteristic detector 12 is v pixels/frame, as previously discussed.

The mean value calculator 92 receives the input pixel value N of the target pixel, the input pixel values of the pixel on the left hand side of the target pixel, and the input pixel values on the right hand side of the target pixel. The mean value calculator 92 calculates the mean value Na of the input pixel value N of the target pixel (Na is referred to as the mean pixel value of the target pixel), the input pixel value of the pixel on the left hand side of the target pixel, and the input pixel value of the pixel on the right hand side of the target pixel, and supplies the mean pixel value Na to the correction value determiner 95.

A correction value ADD to the target pixel determined by the correction value determiner 95 is adjusted by the predetermined adjustment value c. The adjustment value c is not a fixed value but a variable value determined in a predetermined process (hereinafter referred to as an adjustment value determination process). In the adjustment value determination process of the present embodiment, the mean pixel value Na of the target pixel is used. The input pixel value N of the target pixel may be used in the adjustment value determination process. If the target pixel suffers from noise, a processed image may be destroyed. To prevent the processed image from being destroyed, the mean pixel value Na of the target pixel is used.

The mean value calculator 93 is supplied with the input pixel values of the n/2−1 pixels consecutively arranged on the left hand side of the target pixel. The mean value calculator 93 selects k pixels about half the motion speed of the target pixel (k is about v/2) consecutively present on the left hand side of the target pixel from the pixel immediately next to the target pixel, and determines, as a calculation range, a range containing the input pixel values of the k pixels. The mean value calculator 93 calculates a mean value La of the k input pixel values contained in the calculation range (hereinafter referred to as a mean pixel value La of the left pixels) from among the supplied n/2−1 input pixel values, and supplies the mean pixel value La of the left pixels to the correction value determiner 95.

The mean value calculator 94 is supplied with the input pixel values of the n/2−1 pixels consecutively arranged on the right hand side of the target pixel. The mean value calculator 94 selects k pixels about half the motion speed of the target pixel (k is about v/2) consecutively present on the right hand side of the target pixel from the pixel immediately next to the target pixel, and determines, as a calculation range, a range containing the input pixel values of the k pixels. The mean value calculator 94 calculates a mean value Ra of the k input pixel values contained in the calculation range (hereinafter referred to as a mean pixel value Ra of the right pixels) from among the supplied n/2−1 input pixel values, and supplies the mean pixel value Ra of the left pixels to the correction value determiner 95.

The mean pixel value La of the left pixels and the mean pixel value Ra of the right pixels are used in the adjustment value determination process and a process to determine a correction value candidate (herein after a candidate determination process).

In the known LTI technique disclosed in Japanese Unexamined Patent Application Publication No. 2000-324364, a difference between a single pixel leftward spaced from the target pixel by a predetermined distance (hereinafter referred to as a left pixel) and the input pixel value of the target pixel is determined as a first correction value candidate. A difference between a single pixel rightward spaced from the target pixel by a predetermined distance (hereinafter referred to as a right pixel) and the input pixel value of the target pixel is determined as a second correction value candidate. One of the first candidate and the second candidate is determined as a correction value without adding any adjustment value thereto. If the input pixel value of one of the left pixel and the right pixel contains noise in the known LTI technique, the correction value (and the two correction value candidates) cannot be appropriately determined.

To overcome such a drawback, the mean pixel value La of the left pixels and the mean pixel value Ra of the right pixels are used in the candidate determination process in one embodiment of the present invention to appropriately determine the correction value candidate rather than simply using the input pixel value of one of the left pixel and the right pixel.

The rate of change in the input pixel values of the pixels falling within the calculation range may not be constant. The pixel value may decrease after an increase, or may increase after a decrease. In a plane having the abscissa representing the horizontal positions of the pixels and the ordinate representing the pixel values (plane of FIG. 13 to be discussed later), the slope of a line connecting points representing the input pixel values contained in the calculation range (such as points 131 through 134 of FIG. 13 to be discussed later) can be reversed in polarity. If a simple mean value of the input pixel values contained in the calculation range is adopted as the mean pixel value La of the left pixels or the mean pixel value Ra of the right pixels, a new drawback that the correction value (candidate) cannot be appropriately determined arises.

The mean value calculator 93 and the mean value calculator 94 of one embodiment of the present invention overcome the new drawback as below. An input pixel value β represented by a first point subsequent to a polarity change from among the input pixel values contained in the calculation range is updated to a pixel value γ by calculating the right-hand side of the following equation (3). The right-hand side of equation (3) is expressed by an input pixel value α represented by a second point prior to the polarity change. One of the mean pixel value La of the left pixels and the mean pixel value Ra of the right pixels is calculated by regarding the input pixel value of the pixel represented by the first point as the pixel value γ subsequent to updating:

$$\gamma = \alpha - H \times f(H) \tag{3}$$

where H represents a difference between the input pixel value α of the second point prior to the polarity change (an intermediate point 133 of FIG. 3) and the input pixel value β of the first point subsequent to the polarity change (an intermediate point 134 of FIG. 3), namely, α−β.

FIG. 13 illustrates 12 pixels consecutively arranged in the horizontal direction containing the target pixel 121. As shown in FIG. 13, the abscissa represents the positions of the pixels in the horizontal direction while the ordinate represents the pixel values. The calculation range of the mean value calculator 94, namely, the calculation range of the mean pixel value Ra of the right pixels is a range D containing pixel values α, α and β of the three respective points 132 through 134 to the right of the point 131 representing the target pixel.

The polarity of the slope of the line connecting the points 133 and 134 is determined in FIG. 13. The point 134 is a first point subsequent to the polarity change, and the point 133 is a second point prior to the polarity change. The mean value calculator 94 places the input pixel value α represented by the point 133 and the difference H (=α−β) between the input pixel value α and the input pixel value β represented by the point 134 in the right-hand side of equation (3), thereby modifying the input pixel value β represented by the point 134 into the pixel value γ. The mean value calculator 94 adopts the pixel value γ as the updated input pixel value represented by the point 134 within the calculation range D, and adopts the input pixel values of the remaining points 132 and 133 in the original pixel values α thereof to calculate the mean pixel value Ra of the right pixels. More specifically, Ra=(α+α+γ)/3.

Figure 14:
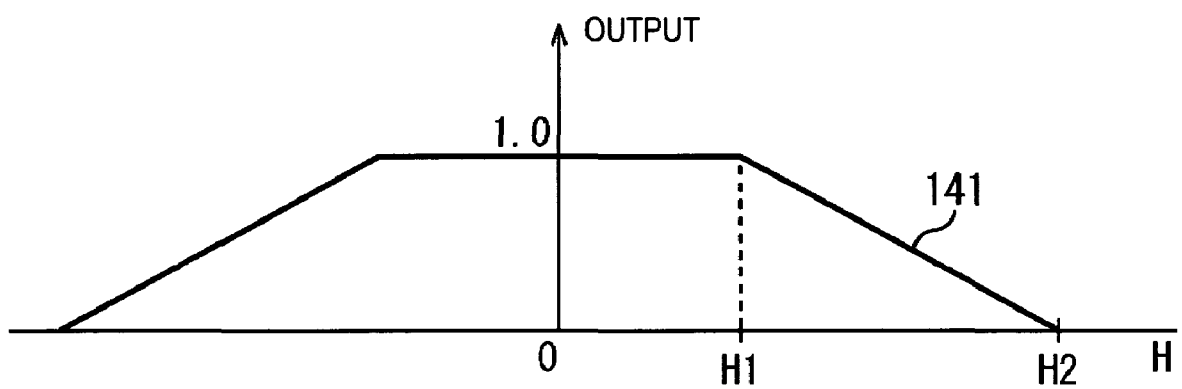
FIG. 14 illustrates further the correction method of the pixel value when the mean pixel value of the pixel group consecutively lined on the right-hand side of the text pixel is calculated.

In the calculation of the right-hand side of equation (3) in accordance with the present embodiment, a function having the characteristics represented by a broken line 141 of FIG. 14 is used for the function f(H).

As shown in FIG. 14, if the difference H between the pixel value α prior to the polarity change and the pixel value β subsequent to the polarity change is a value H2 or larger, the function f(H) becomes zero. A large difference H means a steep slope subsequent to the polarity change. If the slope subsequent to the polarity change is steeper than a predetermined constant value, namely, the value H2, the pixel value γ subsequent to updating becomes the pixel value α from equation (3). More specifically, if the slope subsequent to the polarity change is steeper than the predetermined constant value, the pixel value α is used as the input pixel value of the pixel represented by the point 134 subsequent to the polarity change instead of the pixel value β. The mean pixel value Ra of the right pixels in the calculation range D is thus calculated. More specifically, Ra=(α+α+α)/3=α, and the mean pixel value Ra of the right pixels is determined to be α.

As shown in FIG. 14, if the difference H between the pixel value α prior to the polarity change and the pixel value β subsequent to the polarity change is not larger than a value H1, the function f(H) becomes 1. A small difference H means a mild slope of the line subsequent to the polarity change. If the slope of the line subsequent to the polarity change is milder than a predetermined value, in other words, if the difference value H is not larger than H1, the pixel value γ remains the pixel value β even after updating in accordance with equation (3). If the slope of the line subsequent to the polarity change is equal to or milder than the predetermined value, the pixel value β is used as the input pixel value represented by the point 134 subsequent to the polarity change in the calculation of the mean pixel value Ra of the right pixels in the calculation range D. More specifically, the mean pixel value Ra of the right pixels is determined as being Ra=(α+α+β)/3.

If the slope of the line subsequent to the polarity change is equal to or milder than the predetermined value, the original pixel value β is used as is without updating the pixel value represented by the point 134 because of the following reason. When the slope of the line subsequent to the polarity change is equal to or milder than the predetermined value, the polarity change is likely to have happened in response to noise. However, more appropriate mean pixel value Ra of the right pixels free from noise is obtained from averaging the input pixel values than averaging the pixel vales after being updated.

The calculation of the mean pixel value Ra of the right pixels has been discussed with reference to FIG. 13. When the mean pixel value La of the left pixels is calculated, the input pixel value of the pixel represented by a point subsequent to the polarity change is updated from the pixel value β to the pixel value γ in accordance with equation (3).

Returning to FIG. 12, the correction value determiner 95 determines the correction value ADD based on the input pixel value N of the target pixel from the DL unit 91-(n/2), the mean pixel value Na of the target pixel from the mean value calculator 92, the mean pixel value La of the left pixels from the mean value calculator 93, and the mean pixel value Ra of the right pixels from the mean value calculator 94. The correction value ADD is then supplied to the adder 96.

The adder 96 adds the correction value ADD from the correction value determiner 95 to the input pixel value N of the target pixel from the DL unit 91-($n/2$), and supplies, to the subtractor 82 external to the ALTI module 81, the resulting sum as the output pixel value of the target pixel, namely, the corrected pixel value of the target pixel.

The process of the ALTI module 81 is described below with reference to a flowchart of FIG. 15 before discussing a detailed functional block diagram of the correction value determiner 95.

In step S21, the ALTI module 81 sets a target pixel.

In step S22, the DL unit 91-$l$ through the DL unit 91-$n$ in the ALTI module 81 acquire n input pixel values with reference to the input pixel value N of the target pixel as a center value.

In step S23, the mean value calculator 92 in the ALTI module 81 calculates the mean pixel value Na of the target pixel as previously discussed, and supplies the resulting mean pixel value Na to the correction value determiner 95.

In step S24, the mean value calculator 93 in the ALTI module 81 calculates the mean pixel value La of the left pixels as previously discussed, and supplies the resulting mean pixel value La to the correction value determiner 95.

In step S25, the mean value calculator 94 in the ALTI module 81 calculates the mean pixel value Ra of the right pixels as previously discussed, and supplies the resulting mean pixel value Ra to the correction value determiner 95.

As shown in FIG. 12, the mean value calculators 92 through 94 perform processes thereof independent of each other. The order of steps S23 through S25 are not limited to the order described in FIG. 15. Steps S23 through S25 are thus performed independent of each other.

In step S26, the correction value determiner 95 in the ALTI module 81 determines the two correction value candidates ADDL and ADDR based on the input pixel value N of the target pixel from the DL unit 91-($n/2$), the mean pixel value La of the left pixels from the mean value calculator 93, and the mean pixel value Ra of the right pixels from the mean value calculator 94. The process in step S26 refers to the previously mentioned candidate determination process. The correction value candidates ADDL and ADDR are respectively outputs of a subtractor 101 and a subtractor 102 to be discussed later. The candidate determination process in step S26 and the correction value candidates ADDL and ADDR will be described in more detail later.

In step S27, the correction value determiner 95 determines the adjustment value c-based on the mean pixel value Na of the target pixel from the mean value calculator 92, the mean pixel value La of the left pixels from the mean value calculator 93, and the mean pixel value Ra of the right pixels from the mean value calculator 94. The process in step S27 refers to the previously mentioned adjustment value determination process. The adjustment value c is an output signal from an adjustment value calculator 109 to be discussed later. The adjustment value determination process in step S27 and the adjustment value c will be described in more detail later.

Steps S26 and S27 are performed independent of each other. The order of steps S26 and S27 is not limited to the order described in FIG. 15.

In step S28, the correction value determiner 95 adjusts the correction value candidates ADDL and ADDR using the adjustment value c. The process in step S28 is referred to as an adjustment process. The adjustment process will be described in more detail later.

In step S29, the correction value determiner 95 determines (selects), as a correction value ADD, one of the correction value candidates ADDL and ADDR, adjusted in accordance with the adjustment value c, and zero under a predetermined selection criterion, and supplies the selected value to the adder 96. The process in step S29 is referred to as a correction value selection process. The correction value selection process will be described in more detail later (including the selection criterion).

In step S30, the adder 96 in the ALTI module 81 adds the correction value ADD to the input pixel value N of the target pixel, and supplies, to the subtractor 82, the resulting sum as the output pixel value of the target pixel.

In step S31, the ALTI module 81 determines whether all pixels have been processed.

If it is determined in step S31 that not all pixels have been processed, processing returns to step S21 to repeat the above-described steps. More specifically, another pixel is set up as a target pixel, the correction value ADD is added to the input pixel value N of the target pixel, and the resulting sum is output to the external subtractor 82 as the output pixel value of the target pixel. The pixel value N and the correction value ADD are typically different from pixel to pixel.

A loop process of steps S21 through S31 is repeated with each of the pixels set up as a target pixel, and if it is determined in step S31 that all pixels have been processed, the process of the ALTI module 81 is completed.

Figure 15:
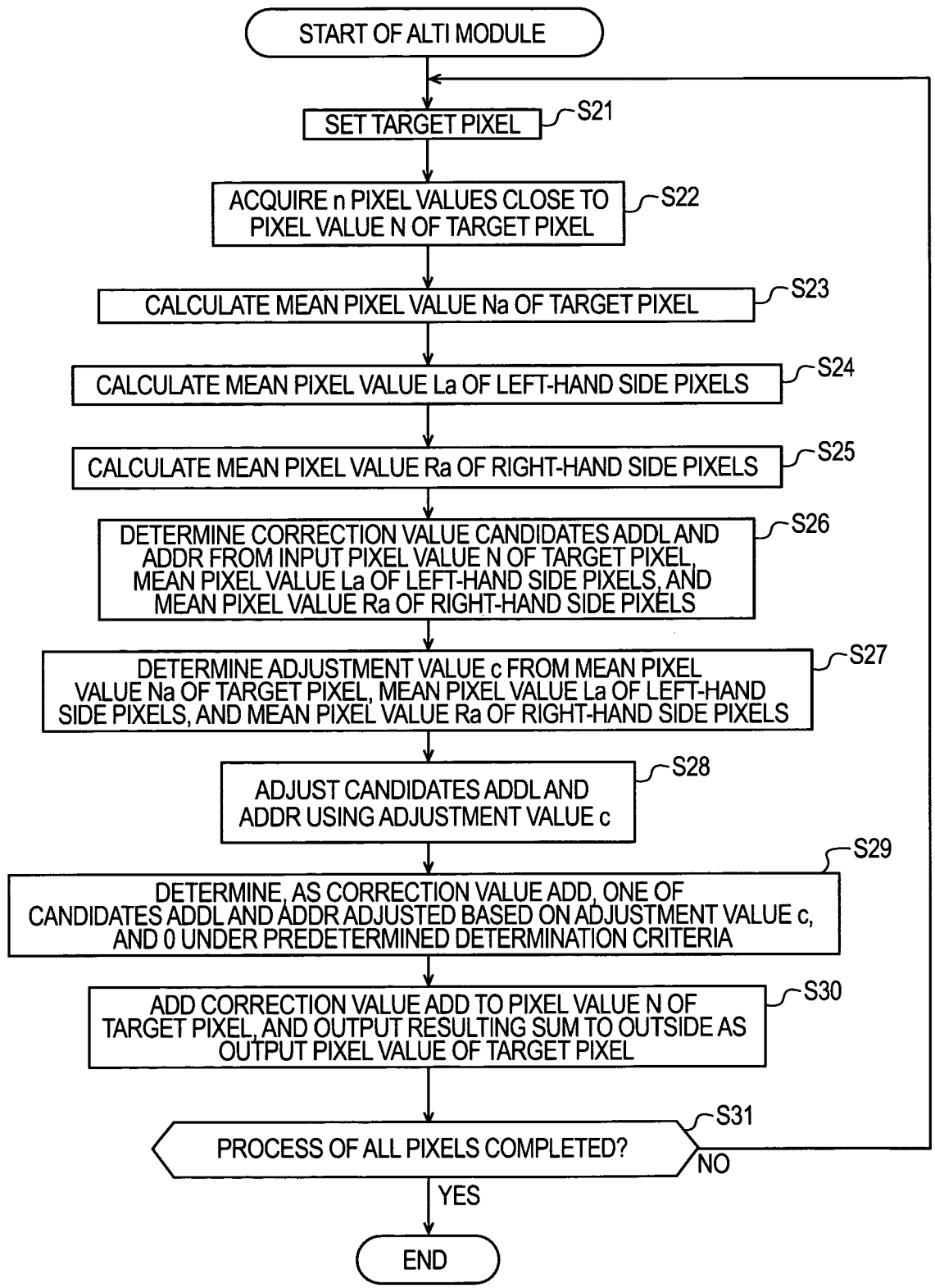
FIG. 15 is a flowchart illustrating the process of the ALTI module of FIG. 12.

The ALTI module 81 is one element of the pickup blur controller 13 of FIG. 13, and the process of the ALTI module 81 of FIG. 15 is thus performed as a portion of the process in step S4 of FIG. 3.

The correction value determiner 95 executes the process in steps S26 through S29. Returning to FIG. 12, the detailed function of the correction value determiner 95 is described below together with the process in steps S26 through S29.

As shown in FIG. 12, the correction value determiner 95 includes the subtractor 101 and the subtractor 102 to perform the candidate determination process in step S26 of FIG. 15. In other words, a candidate determination unit 121, composed of the subtractor 101 and the subtractor 102, executes the candidate determination process in step S26.

The subtractor 101 calculates a difference (=La−N) between the mean pixel value La of the left pixels from the mean value calculator 93 and the input pixel value N of the target pixel from the DL unit 91-($n/2$), and supplies the resulting difference as the correction value candidate ADDL to a multiplier 110.

If the correction value candidate ADDL is determined as the correction value ADD without being adjusted (with the adjustment value c=1 applied thereto) as will be discussed later, the adder 96 adds the correction value ADD (=La−N) to the input pixel value N of the target pixel, and outputs the resulting sum (=La). If the correction value candidate ADDL (=La−N) is used as the correction value ADD, the original pixel value N as the pixel value of the target pixel is corrected to (substituted for) the mean pixel value La of the left pixels.

The subtractor 102 calculates a difference (=Ra−N) between the mean pixel value Ra of the right pixels from the mean value calculator 94 and the input pixel value N of the target pixel from the DL unit 91-($n/2$), and supplies the resulting difference as the correction value candidate ADDL to a multiplier 111.

If the correction value candidate ADDR is determined as the correction value ADD without being adjusted (with the adjustment value c=1 applied thereto) as will be discussed later, the adder 96 adds the correction value ADD (=Ra−N) to the input pixel value N of the target pixel, and outputs the resulting sum (=Ra). If the correction value candidate ADDR (=Ra−N) is used as the correction value ADD, the original pixel value N as the pixel value of the target pixel is corrected to (substituted for) the mean pixel value Ra of the left pixels.

As shown in FIG. 12, the correction value determiner 95 includes the subtractor 103 through the adjustment value calculator 109 to execute the adjustment value determination process in step S27 of FIG. 15. In other words, an adjustment value determiner 122, composed of the subtractor 103 through the adjustment value calculator 109, executes the adjustment value determination process in step S27.

The subtractor 103 calculates a difference (=Na−La) between the mean pixel value Na of the target pixel from the mean value calculator 92 and the mean pixel value La of the left pixels from the mean value calculator 93, and supplies the resulting difference to an adder 105.

The subtractor 104 calculates a difference (=Na−Ra) between the mean pixel value Na of the target pixel from the mean value calculator 92 and the mean pixel value Ra of the right pixels from the mean value calculator 94, and supplies the resulting difference to the adder 105.

The adder 105 sums the output signals of the subtractor 103 and the subtractor 104, and outputs the resulting sum to the ABS unit 106.

The ABS unit 106 calculates the absolute value b of the output signal of the adder 105, and supplies the absolute value b to the divider 108.

In a plane defined by the ordinate representing the pixel values and the abscissa representing the pixel positions in the horizontal direction, a line is drawn to connect a first point representing the mean pixel value La of the left pixels, a second point representing the mean pixel value Na of the target pixel, and a third point representing the mean pixel value Ra of the right pixels in that order. A second derivative value of the line at the second point is calculated by the subtractor 103, the subtractor 104, and the adder 105. The ABS unit 106 calculates the absolute b value of the second derivative value, and supplies the absolute value b to the divider 108. The absolute value b output from the ABS unit 106 is referred to as the second derivative absolute value b.

In view of a line connecting the first point representing the mean pixel value La of the left pixels and the third point representing the mean pixel value Ra of the right pixels in the plane, the second derivative absolute value b represents how far the second point representing the mean pixel value Na of the target pixel is apart from the connecting line.

The correction value determiner 95 adjusts the correction value candidates ADDL and ADDR in response to the magnitude of the second derivative absolute value b, and determines, as the correction value ADD, one of the adjusted correction value candidates ADDL and ADDR. More specifically, the adder 96 outputs, as the output pixel value of the target pixel, the sum of the input pixel value N of the target pixel and the correction value ADD adjusted in accordance with the magnitude of the second derivative absolute value b. An edge portion of the output signal (frame to be processed) of the adder 96 is thus softened in a rising edge thereof.

Given the same second derivative absolute value b, the absolute value h of the difference between the mean pixel value La of the left pixels and the mean pixel value Ra of the right pixels, namely, a distance h (hereinafter referred to as a height h) between the first point and the third point in the ordinate in the plane may become different. If so, the meaning of the magnitude of the second derivative absolute value b becomes different. More specifically, if the magnitude of the second derivative absolute values b is substantially smaller than the height h, in other words, if a quotient (=b/h) that is obtained by dividing the second derivative absolute value b by the height h is small, noise is likely to be generated in the vicinity of the target pixel. In contrast, if the magnitude of the second derivative absolute values b is not so smaller than the height h, in other words, if the quotient (=b/h) is modestly large, noise is less likely to be caused in the vicinity of the target pixel.

If the correction value candidates ADDL and ADDR are adjusted merely in response to the magnitude of the second derivative absolute value b, the correction value ADD of the input pixel value N of the target pixel becomes the same regardless of whether noise occurs or not. This leads to another drawback that the input pixel value N of the target pixel cannot be appropriately corrected.

To overcome this new drawback, the adjustment value determiner 122 in the correction value determiner 95 of the present embodiment of the present invention further includes, in addition to the subtractor 103 through the ABS unit 106, the absolute difference calculator 107, the divider (b/h calculator) 108, and the adjustment value calculator 109.

The absolute difference calculator 107 calculates a difference between the mean pixel value La of the left pixels from the mean value calculator 93 and the mean pixel value Ra of the right pixels from the mean value calculator 94, and further calculates the absolute value h of the difference (h=|La−Na|), namely, the previously mentioned height h, and supplies the height h to the divider 108.

The divider 108 divides the second derivative absolute value b from the ABS unit 106 by the height h from the absolute difference calculator 107, and supplies the resulting quotient (=b/h) to the adjustment value calculator 109. The quotient (=b/h) is a value that is determined by normalizing the second derivative absolute value b by the height h. The quotient (=b/h) is hereinafter referred to as a normalized second derivative value.

In response to the normalized second derivative value from the divider 108, the adjustment value calculator 109 calculates the adjustment value c for the correction value candidates ADDL and ADDR, and supplies the adjustment value c to each of the multiplier 110 and the multiplier 111.

Figure 16:
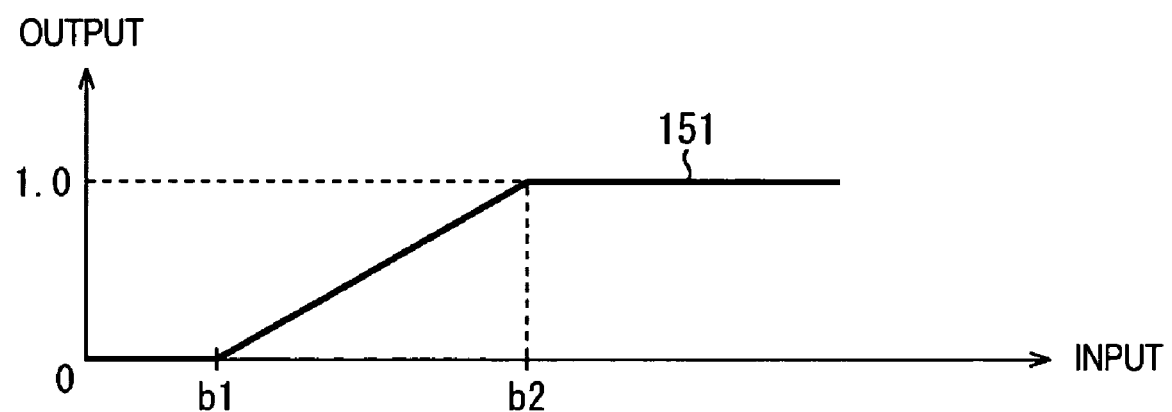
FIG. 16 illustrates characteristics of an adjustment value calculator in the ALTI module of FIG. 12.

The adjustment value calculator 109 holds a function having characteristics represented by a broken line 151 of FIG. 16. The adjustment value calculator 109 applies the normalized second derivative value from the divider 108 as a parameter to the function, and supplies the output of the function (output of FIG. 16) as the adjustment value c to the multiplier 110 and the multiplier 111.

As the shape of the broken line 151 of FIG. 16 shows, the adjustment value c (output) becomes zero if the normalized second derivative value (b/h) is not larger than a constant value b1. This is because the possibility of the pixel being noise is high. As will be described later, the correction value candidates ADDL and ADDR are multiplied by the adjustment value c as zero for adjustment. The correction value candidates ADDL and ADDR thus become zero after adjustment. The correction value ADD also becomes zero, and the input pixel value N of the target pixel remains uncorrected.

As the normalized second derivative value increases above the constant value b1, the adjustment value c (output) also increases. As will be discussed later, the correction value candidates ADDL and ADDR are respectively multiplied by the adjustment value c less than 1. After adjustment, each of the correction value candidates ADDL and ADDR becomes smaller than the original value thereof. The correction value ADD is one of the correction value candidates ADDL and ADDR smaller than the respective original values. The pixel value of the target pixel subsequent to the correction is larger than the mean pixel value La of the left pixels or smaller than the mean pixel value Ra of the right pixels.

If the normalized second derivative value becomes equal to or larger than a constant value b2, the adjustment value c (output) becomes 1. As will be discussed later, each of the correction value candidates ADDL and ADDR is multiplied by the adjustment value c as 1 in adjustment, and the correction value candidates ADDL and ADDR remain unchanged from the original values thereof (in other words, no adjustment is performed). The correction value ADD is one of the correction value candidates ADDL and ADDR in the original values thereof. The pixel value of the target pixel is one of the mean pixel value La of the left pixels and the mean pixel value Ra of the right pixels.

In accordance with the present embodiment, the adjustment value c is determined using the function having the characteristics represented by the broken line 151 of FIG. 16. The normalized second derivative value is input to the function. The correction value ADD is adjusted using the adjustment value c (more precisely, the correction value candidates ADDL and ADDR as the adjustment values are adjusted). The output signal (frame to be processed) of the adder 96 thus mildly rises at the edge portion thereof. In the known LTI, the pixel value of the target pixel is corrected by a hardware switch (in other words, a mere switching of the pixel value), and a mildly rising edge portion cannot be achieved in the output signal of the pixel value. In accordance with the present embodiment, the ALTI module 81 overcomes this problem.

Returning to FIG. 12, the correction value determiner 95 is continuously discussed. The correction value determiner 95 includes the multiplier 110 and the multiplier 111 to perform the adjustment process in step S28 of FIG. 15. In other words, an adjustment unit 123, composed of the multiplier 110 and the multiplier 111, performs the adjustment process in step S28.

The multiplier 110 multiplies the correction value candidate ADDL from the subtractor 101 by the adjustment value c from the adjustment value calculator 109, and supplies the resulting product as the adjusted correction value candidate ADDL to a determiner 113.

The multiplier 111 multiplies the correction value candidate ADDR from the subtractor 102 by the adjustment value c from the adjustment value calculator 109, and supplies the resulting product as the adjusted correction value candidate ADDR to the determiner 113.

The correction value determiner 95 includes a fixed value generator 112 and the determiner 113 to perform the correction value selection process in step S29 of FIG. 15. In other words, a selector 124, composed of the fixed value generator 112 and the determiner 113, performs the correction value selection process in step S29.

The fixed value generator 112 in the present embodiment constantly generates a "0" signal as shown in FIG. 12, and supplies the "0" signal to the determiner 113.

The determiner 113 receives the output signals from the subtractor 103, the subtractor 104, the adder 105, the multiplier 110, the multiplier 111, and the fixed value generator 112. The determiner 113 selects, as the correction value ADD, one of the "0" signal from the fixed value generator 112, the correction value candidate ADDL from the multiplier 110, and the correction value candidate ADDR from the multiplier 111 based on a predetermined selection criterion that is determined by the outputs from the subtractor 103, the subtractor 104, and the adder 105. The determiner 113 supplies the selected signal to the adder 96.

In the plane defined by the ordinate representing the pixel values and the abscissa representing the pixel positions, the connection line is set as a line connecting the first point representing the mean pixel value La of the left pixels and the third point representing the mean pixel value Ra of the right pixels. If the change of direction of the connection line is upward with the second point, representing the mean pixel value Na of the target pixel, positioned above the connection line, the selection criteria of the present embodiment are that the correction value candidate ADDR be selected as the correction value ADD. In contrast, if the change of direction of the connection line is upward with the second point positioned below the connection line, the selection criteria of the present embodiment is that the correction value candidate ADDL be selected as the correction value ADD.

The determiner 113 recognizes the direction of change of the connection line and the positional relationship between the connection line and the second point based on the signals output from the subtractor 103, the subtractor 104, and the adder 105.

If the determiner 113 recognizes the upward direction of change of the connection line and the second point positioned above the connection line based on the output signals from the subtractor 103, the subtractor 104, and the adder 105, the determiner 113 selects the correction value candidate ADDR from the multiplier 111 as the correction value ADD and supplies the correction value ADD to the adder 96.

If the determiner 113 recognizes the upward direction of change of the connection line and the second point positioned below the connection line based on the output signals from the subtractor 103, the subtractor 104, and the adder 105, the determiner 113 selects the correction value candidate ADDL from the multiplier 110 as the correction value ADD and supplies the correction value ADD to the adder 96.

If the target pixel is positioned in a place other than an edge portion, the selection criterion of the present embodiment is that "0" be selected as the correction value ADD. If the determiner 113 recognizes, as about 0, each of the outputs from the subtractor 103, the subtractor 104, and the adder 105, in other words, if the mean pixel value La of the left pixels, the input pixel value N of the target pixel, and the mean pixel value Ra of the right pixels are approximately equal to each other, the determiner 113 recognizes that the target pixel is positioned in a place other than the edge portion. The determiner 113 then selects the "0" signal from the fixed value generator 112 and supplies the "0" signal to the adder 96.

Figure 17:
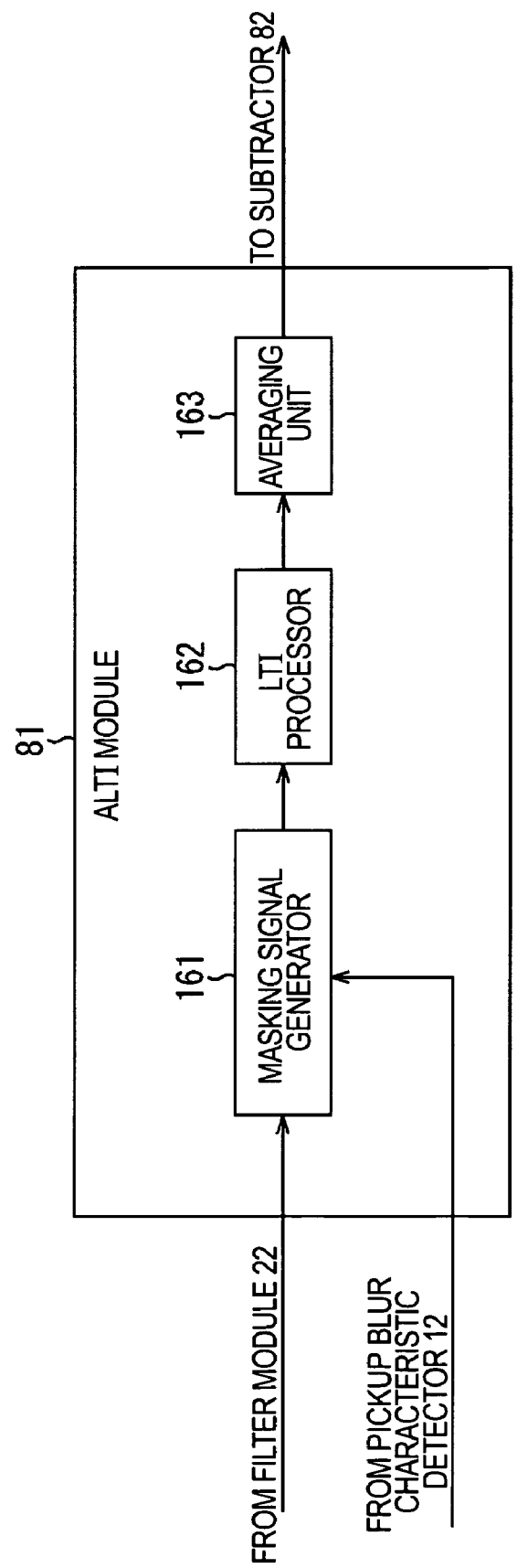
FIG. 17 is a functional block diagram of another ALTI module in the pickup blur corrector of FIG. 11, different from the ALTI module of FIG. 12.

The ALTI module 81 of FIG. 12 has been described. As long as the ALTI module 81 performs a process equivalent to the above-referenced series of process steps, the ALTI module 81 may take any functional structure. For example, the ALTI module 81 may take a functional structure of FIG. 17. FIG. 17 illustrates the structure of the ALTI module 81 different from the functional structure of FIG. 12.

As shown in FIG. 17, the ALTI module 81 includes a masking signal generator 161, an LTI processor 162, and a averaging unit 163.

The masking signal generator 161 receives the output signal from the filter module 22 as an input signal thereof, and successively sets each of pixels forming a frame to be processed as a target pixel. The masking signal generator 161 searches pixels to the right of the target pixel and pixels to the left of the target pixel. Each of the number of the right pixels and the number of the left pixels is half the motion speed of the target pixel. The masking signal generator 161 performs a masking process on a signal showing a pixel value corresponding to the number of pixels equal to the motion speed.

As previously discussed, the motion speed of the target pixel is supplied from the pickup blur characteristic detector 12. The masked signal is supplied from the masking signal generator 161 to the LTI processor 162.

The LTI processor 162 performs the LTI process on each masked signal, and supplies the resulting signal as an output signal to the averaging unit 163.

The averaging unit 163 averages the same number of output signals of the LTI processor 162 as the number of searches by the masking signal generator 161, and supplies the resulting signal as an output signal to the external subtractor 82.

The ALTI module 81 in the pickup blur corrector 23 of FIG. 11 has been discussed with reference to FIGS. 12 through 17.

The gain controller 83 in the pickup blur corrector 23 of FIG. 11 is described below with reference to FIGS. 18 and 19.

Figure 18:
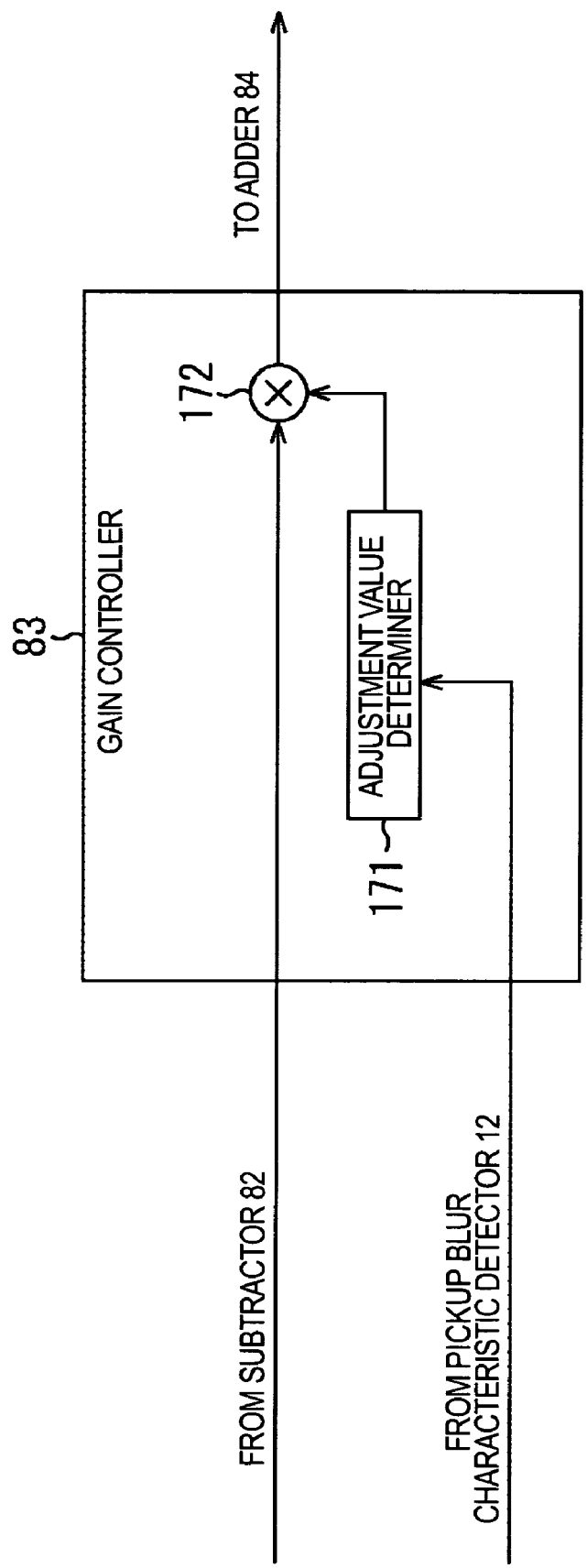
FIG. 18 is a functional block diagram of the gain controller in the pickup blur corrector of FIG. 11.

FIG. 18 is a detailed functional block diagram of the gain controller 83. FIG. 19 illustrates characteristics of an adjustment value determiner 171 in the gain controller 83 of FIG. 18.

The gain controller 83 of FIG. 18 is composed of the adjustment value determiner 171 and a multiplier 172.

Figure 19:
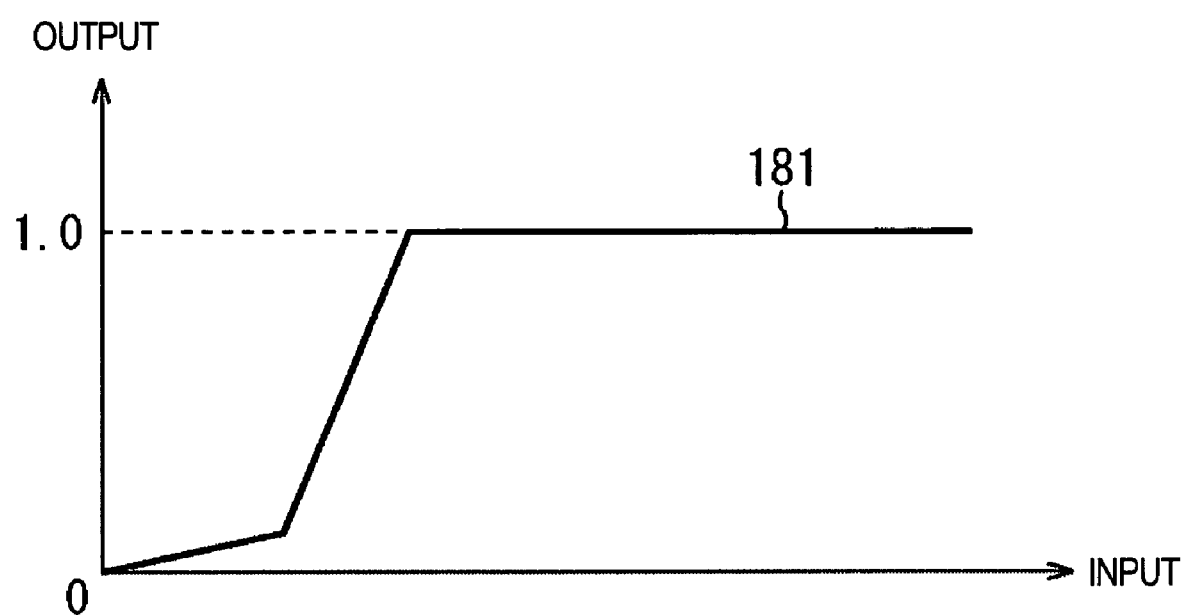
FIG. 19 is a plot of characteristics of an adjustment value determiner in the gain controller of FIG. 18.

The adjustment value determiner 171 holds a function represented by a broken line 181 of FIG. 19. The adjustment value determiner 171 applies the motion speed of the target pixel supplied from the pickup blur characteristic detector 12 as a parameter to the function, and supplies the output of the function (output of FIG. 19) as an adjustment value to the multiplier 172. In other words, the adjustment value determiner 171 has the characteristics of the broken line 181 of FIG. 19.

The multiplier 172 receives the adjustment value from the adjustment value determiner 171 and an output signal from the subtractor 82. As previously discussed with reference to the functional block diagram of FIG. 11, the output signal from the subtractor 82 is the final correction value candidate that is going to be added to the input pixel value of the target pixel by the adder 84 in the pickup blur corrector 23. The multiplier 172 multiplies the final correction value candidate by the adjustment value from the adjustment value determiner 171, and supplies the resulting product to the adder 84 as a final adjustment value.

As seen from the shape of the broke line 181 of FIG. 19 and the functional block diagram of the pickup blur corrector 23 of FIG. 11, the gain controller 83 performs a control process so that the process output of the ALTI module 81 (hereinafter referred to as ALTI) may not greatly affect the final correction value to the pixel value of the target pixel when the motion speed is low. When the motion speed is low, gain drop due to pickup blur is small. The gain drop is simply compensated by raising gain by the filter module 22 of FIGS. 5 and 8. The output signal of the filter module 22 can be supplied to the pickup blur corrector 23 as a final output signal without any substantial correction.

The pickup blur controller 13 in the image processing apparatus 1 of FIG. 1 has been discussed with reference to FIGS. 5 through 19.

Figure 20:
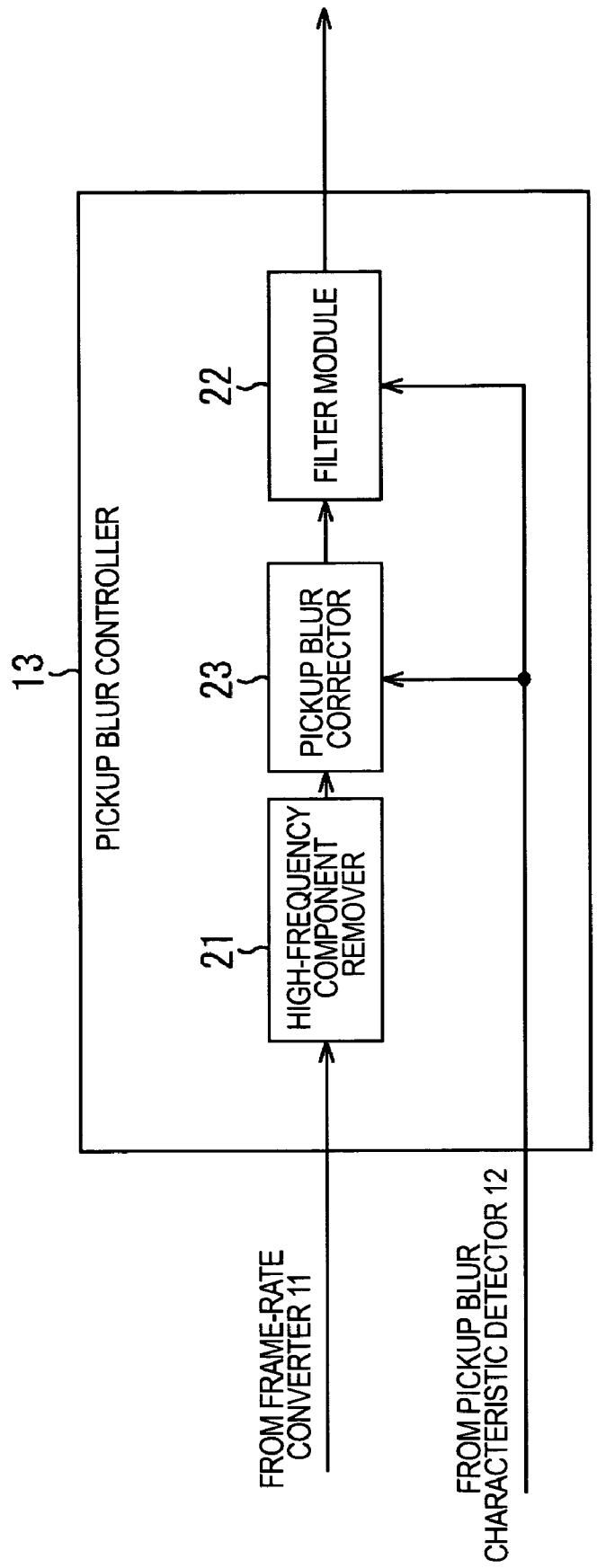
FIG. 20 is a functional block diagram of a pickup blur controller in the image processing apparatus of FIG. 1, different from the pickup blur controller of FIG. 5.
Figure 21:
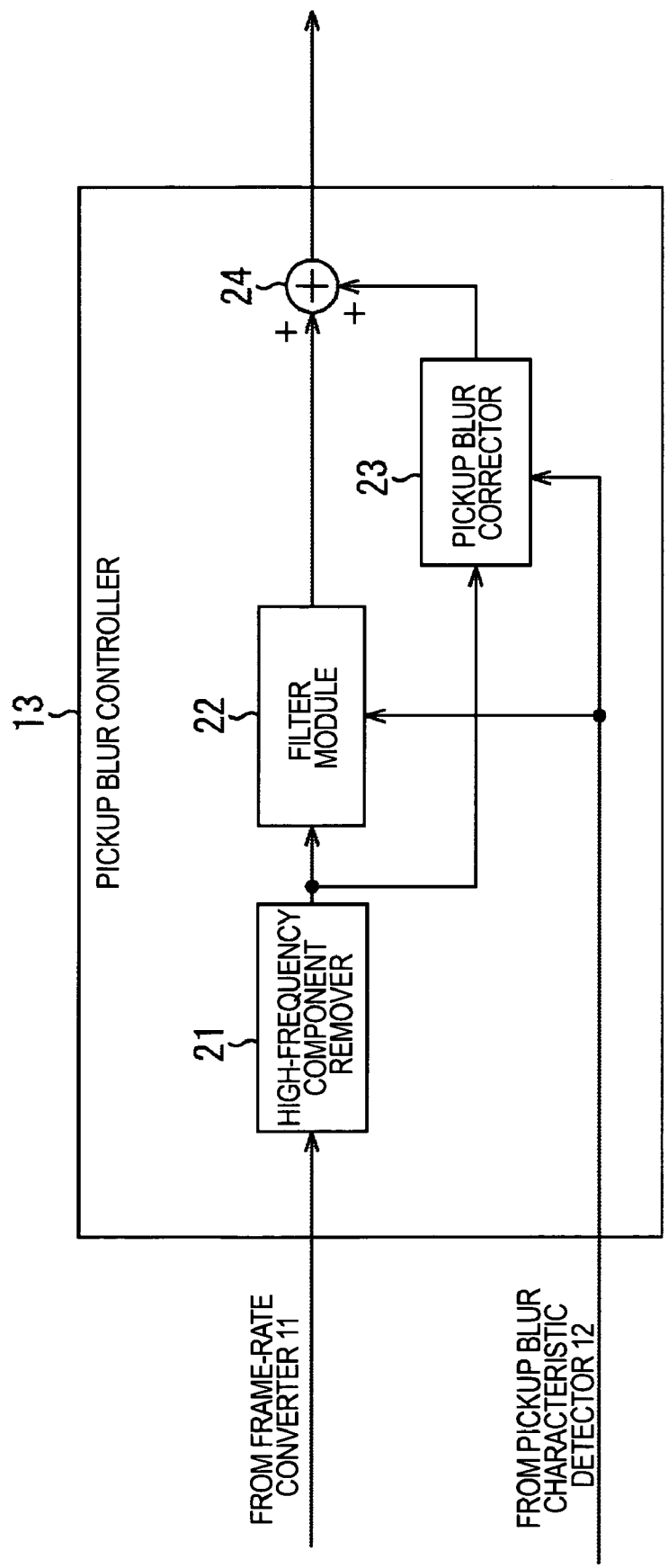
FIG. 21 is a functional block diagram of a pickup blur controller in the image processing apparatus of FIG. 1, different from the pickup blur controllers of FIGS. 5 and 20.

The pickup blur controller 13 is not limited to the functional structure of FIG. 5. FIGS. 20 and 21 illustrate functional structures of the pickup blur controller 13 in accordance with other embodiments of the present invention.

As the pickup blur controller 13 of FIG. 5, the pickup blur controller 13 of FIG. 20 includes the high-frequency component remover 21, the filter module 22 and the pickup blur corrector 23.

As in the pickup blur controller 13 of FIG. 5, the output signal of the frame-rate converter 11 is supplied to the high-frequency component remover 21 as an input signal to the pickup blur controller 13 of FIG. 20. The output signal from the pickup blur characteristic detector 12 is supplied to each of the filter module 22 and the pickup blur corrector 23.

As shown in FIG. 20, the output signal from the high-frequency component remover 21 is supplied to the pickup blur corrector 23, and the output signal from the pickup blur corrector 23 is supplied to the filter module 22. The output signal from the filter module 22 is provided as a final process output signal of the pickup blur controller 13.

As shown in FIG. 20, the filter module 22 and the pickup blur corrector 23 are reversed in arrangement location from the counterparts of FIG. 5. In other words, the order of arrangement of the filter module 22 and the pickup blur corrector 23 (namely, the order of process) is not limited to a particular one. Any of the processes of the filter module 22 and the pickup blur corrector 23 can be performed first.

As the pickup blur controllers 13 of FIGS. 5 and 20, the pickup blur controller 13 of FIG. 21 includes the high-frequency component remover 21, the filter module 22 and the pickup blur corrector 23. The pickup blur controller 13 of FIG. 21 further includes an adder 24.

As in the pickup blur controllers 13 of FIGS. 5 and 20, the output signal from the frame-rate converter 11 is supplied to the high-frequency component remover 21 as an input signal to the pickup blur controller 13 of FIG. 21. The output signal from the pickup blur characteristic detector 12 is supplied to each of the filter module 22 and the pickup blur corrector 23.

As shown in FIG. 21, the output signal from the high-frequency component remover 21 is supplied to each of the filter module 22 and the pickup blur corrector 23. The output signals from the filter module 22 and the pickup blur corrector 23 are supplied to the adder 24. The adder 24 adds the output signal of the filter module 22 to the output signal of the pickup blur corrector 23, and outputs the resulting sum as a final process output signal of the pickup blur controller 13.

The filter module 22 and the pickup blur corrector 23, shown in FIG. 21, are arranged in parallel while the filter module 22 and the pickup blur corrector 23, shown in FIGS. 5 and 20, are connected in a cascade fashion. The filter module 22 and the pickup blur corrector 23 may be arranged in a parallel fashion or in a cascade fashion. If the filter module 22 and the pickup blur corrector 23 employ a line memory, the parallel arrangement of the filter module 22 and the pickup blur corrector 23 as shown in FIG. 21 permits the line memory to be shared by the filter module 22 and the pickup blur corrector 23. The count of components in the associated circuit is thus reduced.

In the known image processing technique, the pickup blur of a moving object is uniformly processed regardless of the degree of blur and still image state. In accordance with the embodiment of the present invention, the use of the pickup blur controller 13 changes an enhancement amount in response to the state of a moving image by calculating the motion vector, thereby permitting blur to be improved without generating ringing. Since a hardware switch is used to switch signals in the known LTI, the processed image itself is often destroyed. The pickup blur controller 13 having the ALTI module 81 as an element thereof is able to switch signals in a mild fashion, thereby preventing the processed image from being destroyed.

For simplicity of explanation, the direction of the motion vector (motion direction) is aligned with the horizontal direction in the above discussion. The pickup blur controller 13 performs the same process as the one described above at any motion direction. More specifically, regardless of the motion direction, the pickup blur controller 13 corrects the-pixel value of the target pixel to control the pickup blur. In the ALTI module 81 of FIG. 12, the pixel values of the n pixels centered on the target pixel and consecutively lined in the motion direction (in a vertical direction, for example) are successively input to the DL unit 91-*l* in the order of pixel arrangement. The same is true of the other functional blocks.

The pickup blur controller 13 uses the motion speed (absolute value of the motion vector) as a parameter in the correction of each pixel value. Alternatively, another parameter may also be used as long as the parameter represents characteristics of pickup blur.

For example, the pickup blur controller 13 may use, as a parameter representing the characteristics of the pickup image, a shutter speed of a camera at the time of pickup of a moving image to be processed. This is because if the shutter speed is different as shown in FIG. 22, the degree of pickup blur is affected by time Ts.

Figure 22:
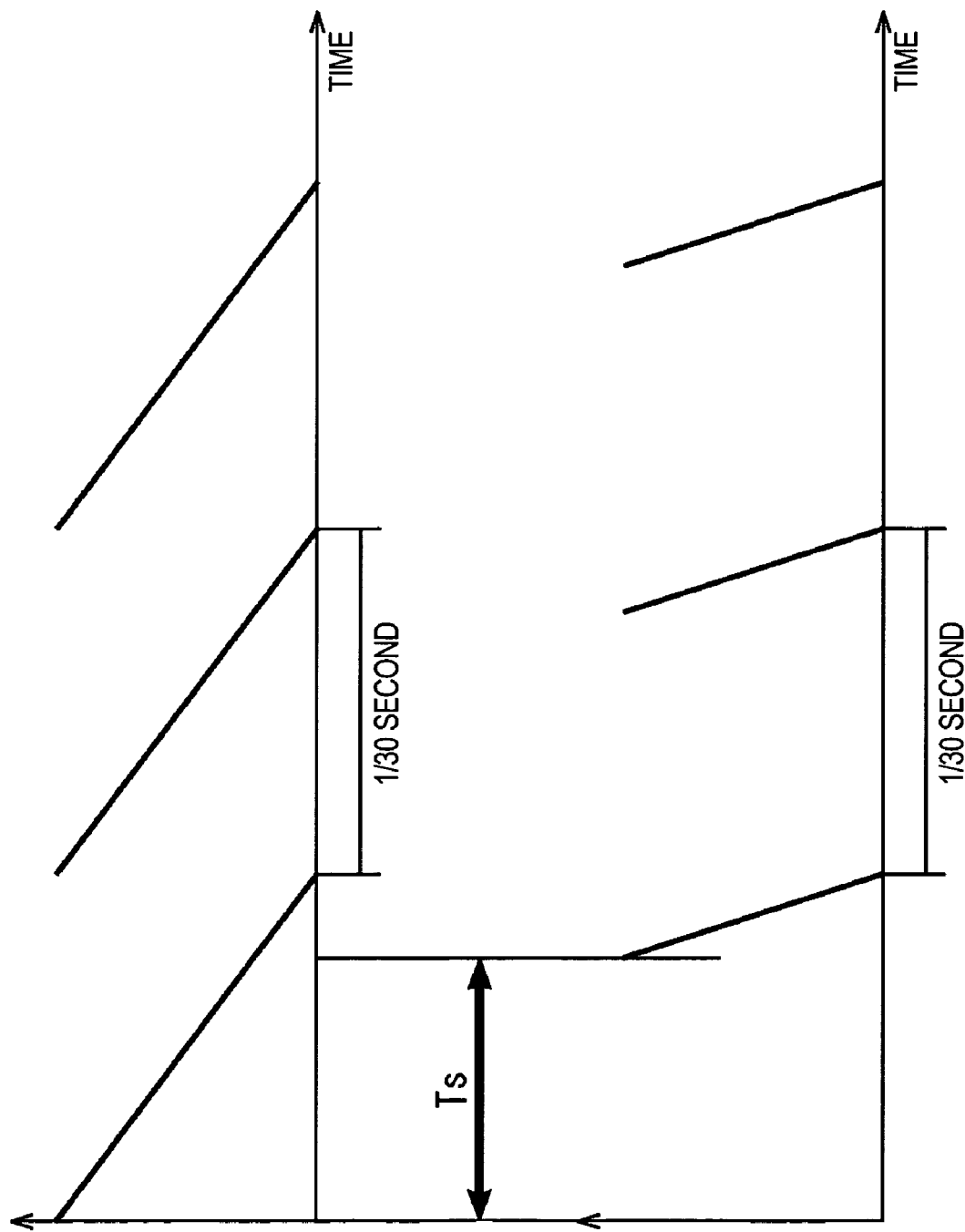
FIG. 22 is a plot of a shutter speed of a camera and characteristics of pickup blur.

As shown in the upper portion of FIG. 22, the shutter speed and a frame rate are the same ⅟30 second. In the lower portion of FIG. 22, the shutter speed is faster than the frame rate by (⅟30-Ts). In both portions of FIG. 22, the abscissa represents time, and the ordinate represents a ratio of shutter opening time. The ratio of shutter opening time refers to (Ts/Vs)× 100% where Va seconds represents shutter speed (Va is any value equal to or larger than 0), first time with a shutter opened is 0%, second time with the shutter closed after time elapse of V seconds from the first time is 100%, and time Ta seconds represents a time length from the first time to the current time (Ta is any value equal to or larger than 0 and equal to or smaller than V). In the ordinate of FIG. 11, a value in contact with the time axis is 100%, and a maximum value (the topmost value of each line) is 0%. In the upper and lower portions of FIG. 22, the lower the position along the ordinate, the larger the ratio of shutter opening becomes.

For example, a single detector element of the camera now corresponds to a single pixel in a frame. If the shutter speed is ⅟30 second as shown in the upper portion of FIG. 22, an integrated value of light input from the single detector element of the camera for a duration of shutter open time of ⅟30 second is output as a pixel value of the corresponding pixel. If the shutter speed is (⅟30-Ts), the integrated value of light input from the single detector element of the camera for a duration of shutter open time of (⅟30-Ts) second is output as a pixel value of the corresponding pixel.

The shutter speed corresponds to light storage time (light exposure time) of the detector element. For example, if an object moving across in front of a predetermined detector element is present in space, the detector element receives light different from the object, namely, background light longer by time Ts seconds in a shutter speed of ⅟30 second than in a shutter speed of (⅟30-Ts) second. The ratio of integrated value of light such as background light, different from light from the object, increases in the pixel value output from the single detector element more in a shutter speed of ⅟30 second than in a shutter speed of (⅟30-Ts) second.

In summary, the slower the shutter speed, the larger the degree of pickup blur. The shutter speed thus represents one characteristic of the pickup blur. As the motion speed, the shutter speed can also be used as a parameter representing the characteristics of the pickup blur.

The shutter speed is thus used as a parameter representing the characteristics of the pickup blur. For example, the pickup blur characteristic detector 12 of FIG. 1 analyzes header information attached to moving image data supplied from the frame-rate converter 11 to detect the shutter speed at each frame, and supplies the shutter speed data as a parameter representing the characteristics of the pickup image to the pickup blur controller 13. Using the shutter speed instead of the motion speed, the pickup blur controller 13 performs the above-referenced series of steps to appropriately correct each pixel value. The pickup blur controller 13 using the shutter speed is substantially identical in functional structure to the pickup blur controller 13 using the motion speed. Each of the pickup blur controllers 13 previously discussed with reference to FIGS. 5 through 19 appropriately corrects each pixel value by performing the above-referenced series of steps with the shutter speed used as a parameter.

The image processing apparatus 1 of FIG. 1 has been described as one embodiment of the present invention. The present invention is not limited to the image processing apparatus 1 of FIG. 1.

More specifically, FIGS. 23 through 26 are functional block diagrams of image processing apparatuses in accordance with other embodiments of the present invention.

For example, as the image processing apparatus 1 of FIG. 1, an image processing apparatus 201 of FIG. 23 includes the frame-rate converter 11, the pickup blur characteristic detector 12, and the pickup blur controller 13.

In the image processing apparatus 201 of FIG. 23, the pickup blur controller 13 processes an image input to the image processing apparatus 201, namely, a moving image prior to the high frame-rate conversion process of the frame-rate converter 11. The pickup blur characteristic detector 12 detects the value of a parameter from the moving image prior to the high frame-rate conversion process of the frame-rate converter 11, and supplies the detection results to the pickup blur controller 13.

The image processing apparatus 201 of FIG. 23 performs the process of FIG. 3 in the order of steps S1, S3, S4, S2, and S5.

For example, as the image processing apparatus 1 of FIG. 1, and the image processing apparatus 201 of FIG. 23, an image processing apparatus 202 of FIG. 24 includes the frame-rate converter 11, the pickup blur characteristic detector 12, and the pickup blur controller 13.

As in the image processing apparatus 1 of FIG. 1, the pickup blur controller 13 in the image processing apparatus 202 of FIG. 24 processes a moving image into which the frame-rate converter 11 has converted an input moving image through the high frame-rate conversion process. More specifically, the pickup blur controller 13 performs the correction process on the moving image that has undergone the high frame-rate conversion process.

However, the pickup blur characteristic detector 12 in the image processing apparatus 202 of FIG. 24 detects the parameter representing the characteristics of the pickup blur from the input moving image, namely, the moving image that has not yet undergone the high frame-rate conversion process of the frame-rate converter 11. The detected parameter is then supplied to the pickup blur controller 13. More specifically, the pickup blur controller 13 in the image processing apparatus 202 of FIG. 24 corrects the pixel value of each pixel based on the parameter detected from the moving image not yet frame rate converted.

The image processing apparatus 202 of FIG. 24 performs the image process of FIG. 3 in the order of steps S1, S2, S3, S4 and S5. However, in step S3, the parameter value representing the characteristics of the pickup blur is detected from the moving image not yet high-frame rate converted, namely, each of the frames forming the moving image input in step S1.

Figure 25:
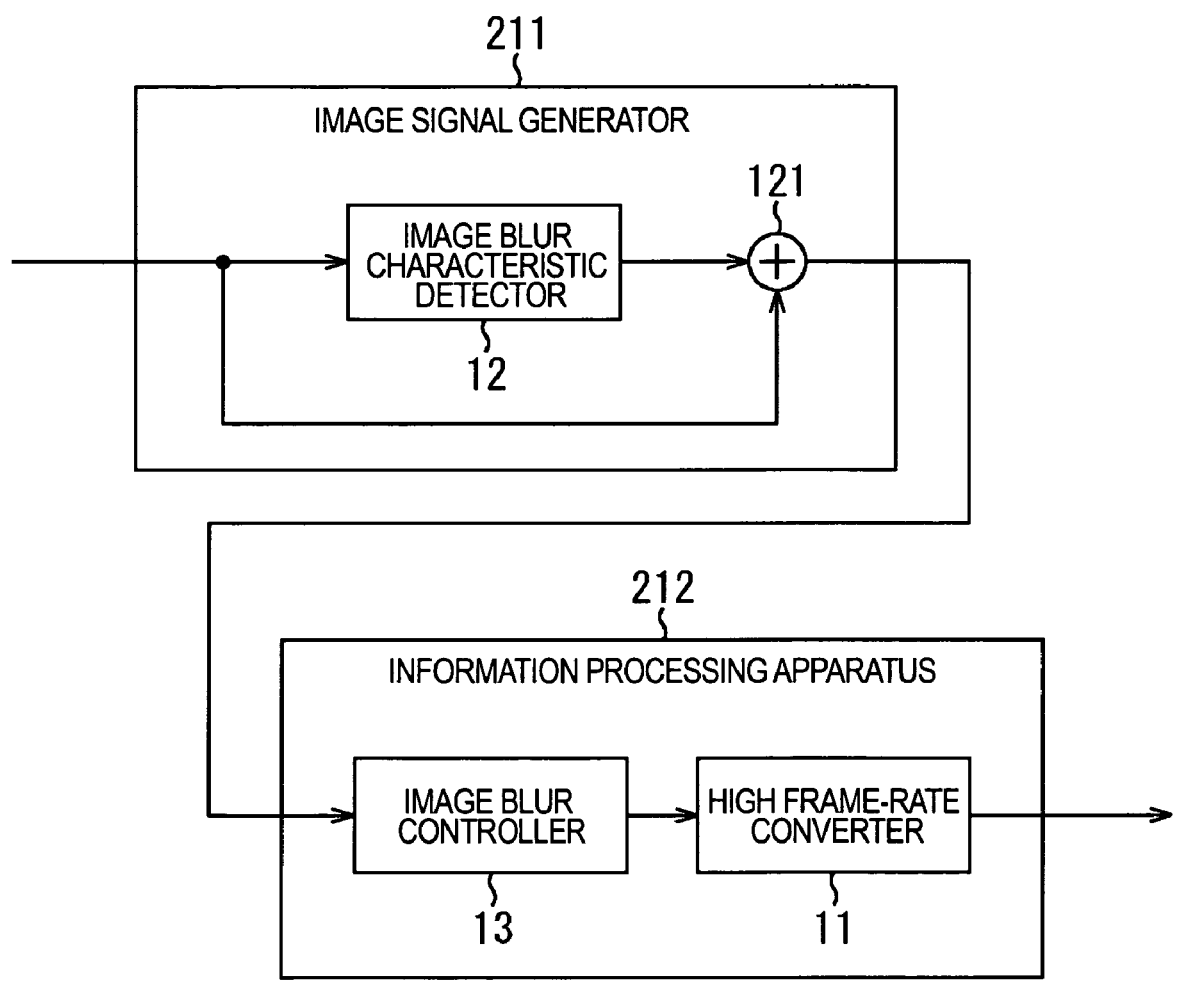
FIG. 25 is a functional block diagram of an image processing apparatus of still another embodiment of the present invention, different from the image processing apparatuses of FIGS. 1, 23 and 24.
Figure 26:
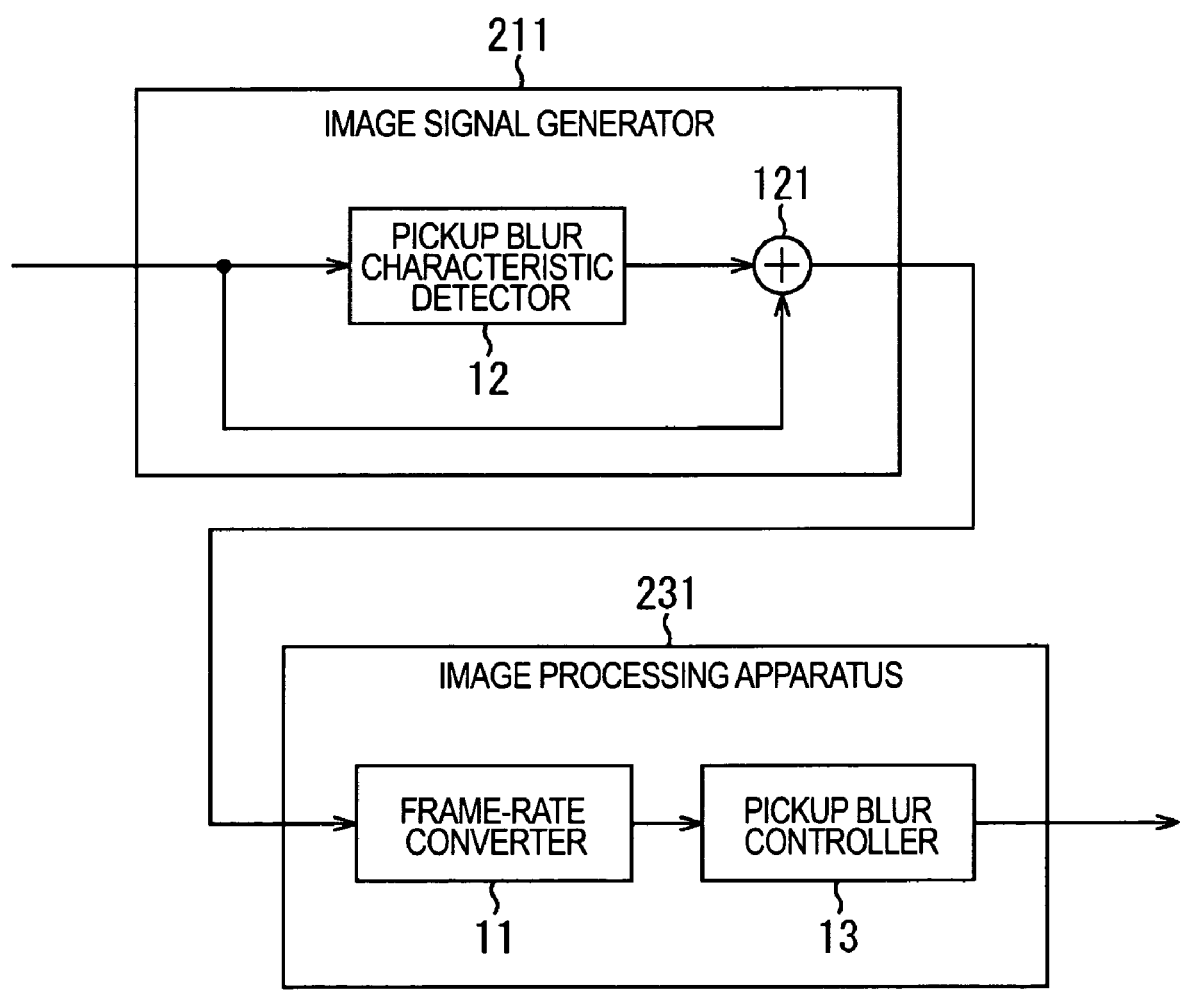
FIG. 26 is a functional block diagram of an image processing apparatus of still another embodiment of the present invention, different from the image processing apparatuses of FIGS. 1, 23, 24, and 25.

In contrast to the image processing apparatus 201 of FIG. 23 and the image processing apparatus 202 of FIG. 24, each of an image processing apparatus 212 of FIG. 25 and an image processing apparatus 231 of FIG. 26 is composed of the frame-rate converter 11 and the pickup blur controller 13 with the pickup blur characteristic detector 12 not contained.

As shown in FIGS. 25 and 26, the pickup blur characteristic detector 12 is arranged together with a superimposer 121 in another image processing apparatus 211 (hereinafter image signal generator 211). A moving image input to the image signal generator 211 is supplied to each of the pickup blur characteristic detector 12 and the superimposer 121. The pickup blur characteristic detector 12 detects the value of the parameter representing the characteristics of the pickup blur from the moving image, and supplies the parameter value to the superimposer 121. The superimposer 121 superimpose the parameter value representing the characteristics of the pickup blur to the moving image and outputs the resulting signal.

Each of the image processing apparatus 212 of FIG. 25 and the image processing apparatus 231 of FIG. 26 receives the moving image (signal) having the parameter value superimposed thereon.

In the image processing apparatus 212 of FIG. 25, the pickup blur controller 13 separates the parameter value from the moving image, and corrects each of pixel values in the frames forming the separated moving image based on the parameter value representing the characteristics of pickup blur.

The frame-rate converter 11 performs the high frame-rate conversion process on the moving image corrected by the pickup blur controller 13, and outputs the resulting moving image, namely, the moving image high frame-rate converted and then corrected.

The image processing apparatus 212 of FIG. 25 performs steps S1, S4, S2, and S5 of the image process of FIG. 3 in that order.

In the image processing apparatus 231 of FIG. 26, the frame-rate converter 11 separates the parameter value representing the characteristics of the pickup blur from the moving image, performs the high frame-rate conversion process on the separated moving image, and supplies the resulting moving image, namely, the high frame-rate converted moving image to the pickup blur controller 13. The parameter value, representing the characteristics of the pickup blur, separated by the frame-rate converter 11 is also supplied to the pickup blur controller 13.

The pickup blur controller 13 corrects each of the pixels in each of the frames forming the high frame-rate converted moving image based on the parameter value representing the characteristics of the pickup blur, and outputs the resulting moving image, namely, the moving image corrected and high frame-rate converted.

Part or whole of the series of above-referenced process steps can be executed by hardware or software.

Figure 27:
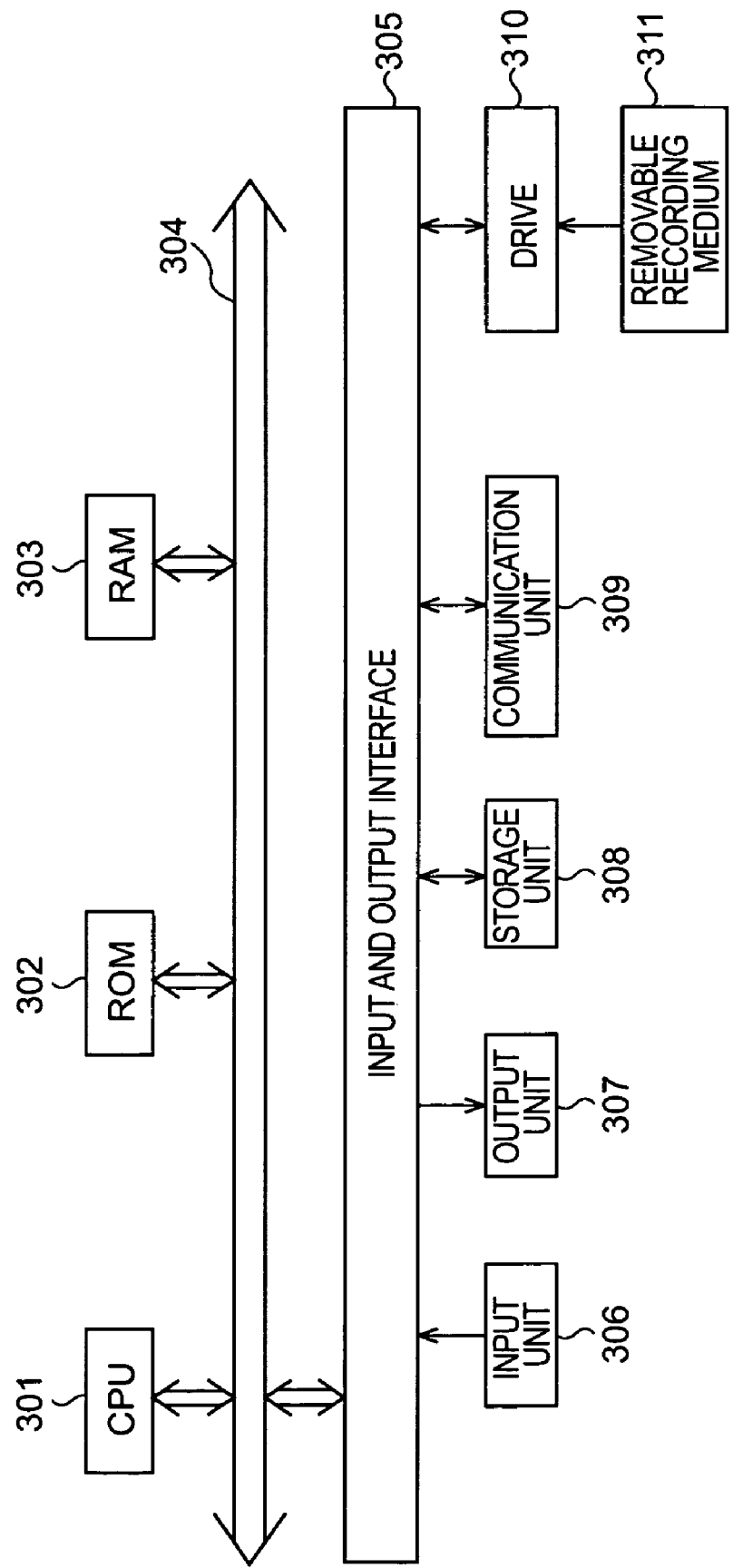
FIG. 27 is a block diagram of a hardware structure of part or whole of the image processing apparatus incorporating the present invention.

Part (such as the pickup blur controller 13) or whole of the image processing apparatus 1 of FIG. 1, part or whole of the image processing apparatus 201 of FIG. 23, part or whole of the image processing apparatus 202 of FIG. 24, part or whole of the image processing apparatus 212 of FIG. 25, or part or whole of the image processing apparatus 231 of FIG. 26 may be composed of a computer of FIG. 27.

As shown in FIG. 27, a central processing unit (CPU) 301 performs a variety of processes in accordance with one of a program stored in a read-only memory (ROM) 302 and a program that is loaded from a storage unit 308 to a random-access memory (RAM) 303. The RAM 303 stores, as necessary, data required by the CPU 301.

The CPU 301, the ROM 302, and the RAM 303 are interconnected to each other via a bus 304. The bus 304 connects to an input and output interface 305.

Also connected to the input and output interface 305 are an input unit 306 composed of a keyboard, and a mouse, an output unit 307 composed of a display, a storage unit 308 composed of a hard disk, and a communication unit 309 composed of a modem and a terminal adaptor. The communication unit 309 performs a communication process via a network such as the Internet.

A drive 310 is connected to the input and output interface 305. A removable medium 311, such as a magnetic disk, an optical disk, a magneto-optical disk, or a semiconductor memory, is loaded onto the drive 310, and computer program read from the removable medium 311 is installed onto the storage unit 308.

When the series of process steps is performed by software, a corresponding software program is installed via a network or from a recording medium onto a computer built in dedicated hardware or a general-purpose computer performing a variety of processes.

The recording medium storing the computer program may be supplied to the user separate from the apparatus of FIG. 27. The recording media include the removable recording medium 211 (package media) including a magnetic disk (such a floppy disk®), an optical disk (such as a compact disk read-only memory (CD-ROM), and a digital versatile disk (DVD)), a magneto-optic disk (such as Mini-Disk (MD®)), and a semiconductor memory. The recording media further include the ROM 302 storing the computer program, and a hard disk contained in the storage unit 308, each storing the software program and supplied in the apparatus to the user.

The process steps discussed in this specification are sequentially performed in the time series order as stated. Alternatively, the steps may be performed in parallel or separately.

In this specification, the system refers to a system composed of at least an apparatus.

The high frame-rate conversion process performed in each the previously discussed embodiments is not limited to any combination of the first frame rate (frame frequency) of the input video signal and the second frame rate (frame frequency) of the output vide signal described above. For example, the first frame rate of the input video signal may be 60 (or 30) Hz and the second frame rate of the output video signal may be 120 Hz. Alternatively, the first frame rate of the input video signal may be 60 (or 30) Hz, and the second frame rate of the output video signal may be 240 Hz. For example, the first frame rate of the phase alternation by line (PAL) input video signal may be 50 Hz, and the second frame rate of the output video signal may be 100 or 200 Hz. For example, the first frame rate of the input video signal may be 48 Hz and the second frame rate of the output video signal may be a predetermined frequency higher than 48 Hz.

By performing the high frame-rate conversion process on the input video signal of the known television system in accordance with one of the previously discussed embodiments, a known content may be displayed at high image quality.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for acquiring, on a per access unit basis, a parameter value indicating characteristics of image blur taking place during image pickup of a moving image by a predetermined image pickup device, a plurality of access units forming the moving image, the image processing apparatus comprising a corrector for correcting pixel values of a plurality of pixels forming an access unit to be processed, based on at least one of the parameter values corresponding to the access unit to be processed, the corrector comprising:

means for setting, as a target pixel, one of the plurality of pixels forming the access unit to be processed, and acquiring input pixel values including a first input value of the target pixel from among one of n pixels centered on the target pixel and consecutively arranged in a first direction, n being an integer equal to or more than 3;

means for determining a first calculation range of input pixel values of k pixels arranged further in a first direction than the target pixel from among the input pixel values based on a parameter value corresponding to the target pixel, and calculating a first direction mean pixel value of the input pixel values falling within the first calculation range, k being an integer less than n/2;

means for determining a second calculation range of input pixel values of k pixels arranged further in a second direction, opposed to the first direction, than the target pixel from among the input pixel values based on a parameter value corresponding to the target pixel, and calculating a second direction mean pixel value of the input pixel values falling within the second calculation range;

means for determining a correction value correcting the first input value of the target pixel based on the relationship of the first direction mean pixel value, the first input value of the target pixel, and the second direction mean pixel value; and means for adding the correction value to the first input value of the target pixel, and outputting the result of adding the first input value of the target pixel and the correction value as an output pixel value of the target pixel.

2. The image processing apparatus according to claim 1, further comprising means for calculating a target mean pixel value of the target pixel and m pixels adjacent to the target pixel, m being an integer equal to or more than 1, wherein the means for determining a correction value includes:

a candidate determination unit for determining, as a first candidate, a difference value between the first direction mean pixel value and the first input value of the target pixel, and as a second candidate, a difference value between the second direction mean pixel value and the first input value of the target pixel;

an adjustment value determination unit for determining an adjustment value adjusting the correction value, using the positional relationship of a first point indicating the first direction mean pixel value, a second point indicating the target mean pixel value, and a third point indicating the second direction mean pixel value in a plane defined by a first axis representing positions of the pixels, and a second axis representing pixel values;

an adjustment unit for adjusting the first candidate and the second candidate, determined by the candidate determination unit, using the adjustment value determined by the adjustment value determination unit; and a selection unit for selecting one of the first and second candidates and a predetermined fixed value according to a predetermined selection criterion, and setting the selected value as the correction value.

3. The image processing apparatus according to claim 1, wherein the adjustment value determination unit divides the absolute value of a second derivative value at the second point of a line connecting the first point, the second point and the third point, by a distance between the first point and the third point along the second axis, and determines the adjustment value based on the resulting quotient.

4. The image processing apparatus according to claim 1, wherein the means for determining a first calculation range and the means for determining a second calculation range determines whether the polarity of the slope of a line is changing in a plane defined by a first axis representing positions of the pixels and a second axis representing pixel values, the line connecting points respectively indicating the k input pixel values falling within the determined calculation range;

if the polarity of the slope of the line is determined as being not changing, one of the first direction mean pixel value and the second direction mean pixel value is calculated using the k input pixel values; and if the polarity of the slope of the line is determined as being changing, the first input value indicated by a point subsequent to a change in polarity, from among the k input pixel values, is corrected based on the first input value indicated by a point prior to the change in polarity, and one of the first direction mean pixel value and the second direction mean pixel value is calculated using both the corrected input pixel values from among the k input pixel values, and the remaining uncorrected input pixel values.

5. The image processing apparatus according to claim 1, wherein the corrector further comprises a first corrector unit and a second corrector unit, wherein the second corrector unit includes:

means for converting characteristics of a motion averaging filter indicating the image blur, in response to the value of one of the parameter values corresponding to the target pixel, performing a motion averaging filtering operation featuring the converted characteristics on each of input pixel values of pixels in a predetermined block containing the target pixel, and outputting, as a first value, a resulting corrected first input value of the target pixel;

means for calculating a difference between the first input value of the target pixel and the first value, and outputting the difference as a second value; and means for adding the second value to the first input value of the target pixel, and outputting the resulting sum as an output pixel value of the target pixel.

6. The image processing apparatus according to claim 1, wherein a motion vector in each of the plurality of pixels forming the moving image is acquired as a parameter value of the respective pixel.

7. The image processing apparatus according to claim 1, wherein when the plurality of access units forming the moving image are picked up by the image pickup device, a shutter speed of the image pickup device is acquired as the parameter value.

8. The image processing apparatus according to claim 1, further comprising means for performing a rate conversion operation for converting a rate of the access unit in the moving image from a current first rate to a second rate higher than the first rate, wherein the corrector corrects the pixel value of each of the plurality of pixels forming the access unit to be processed, before or after performing the rate conversion operation on the access unit to be processed.

9. The image processing apparatus according to claim 8, wherein the first rate is 30 Hz while the second rate is 120 Hz.

10. The image processing apparatus according to claim 8, wherein the first rate is 60 Hz while the second rate is 120 Hz.

11. The image processing apparatus according to claim 8, wherein the first rate is 60 Hz while the second rate is 240 Hz.

12. The image processing apparatus according to claim 8, wherein the first rate is 50 Hz while the second rate is 100 Hz.

13. The image processing apparatus according to claim 8, wherein the first rate is 50 Hz while the second rate is 200 Hz.

14. An image processing method of detecting and acquiring, on a per access unit basis, a parameter value indicating characteristics of image blur taking place during the image pickup of a moving image by a predetermined image pickup device, a plurality of access units forming the moving image, the image processing method comprising correcting pixel values of a plurality of pixels forming an access unit to be processed, based on at least one of the parameter values corresponding to the access unit to be processed, the method comprising:

using a corrector to perform the correcting steps of:

setting, as a target pixel, one of the plurality of pixels forming the access unit to be processed;

acquiring input pixel values including a first input value of the target pixel from among one of n pixels centered on the target pixel and consecutively arranged in a first direction, n being an integer equal to or more than 3;

determining a first calculation range of input pixel values of k pixels arranged further in a first direction than the target pixel from among the input pixel values based on the parameter value corresponding to the target pixel;

calculating, a first direction mean pixel value of the input pixel values falling within the first calculation range, k being an integer less than n/2;

determining a second calculation range of input pixel values of k pixels arranged further in a second direction, opposed to the first direction, than the target pixel from among the input pixel values based on the parameter value corresponding to the target pixel;

calculating a second direction mean pixel value of the input pixel values falling within the second calculation range;

determining a correction value correcting the first input value of the target pixel based on the relationship of the first direction mean pixel value, the first input value of the target pixel, and the second direction mean pixel value;

adding the correction value to the first input value of the target pixel; and outputting the result of adding the first input value of the target pixel and the correction value as an output pixel value of the target pixel.

15. A computer readable recording medium storing a computer program for causing a computer to acquire, on a per access unit basis, a parameter value indicating characteristics of image blur taking place during the image pickup of a moving image by a predetermined image pickup device, a plurality of access units forming the moving image, the computer program comprising program code for correcting a pixel value of a plurality of pixels forming each an access unit to be processed, based on at least one of the parameter values corresponding to the access unit to be processed, the correcting step comprising:

setting, as a target pixel, one of the plurality of pixels forming the access unit to be processed;

acquiring input pixel values including a first input value of the target pixel from among one of n pixels centered on the target pixel and consecutively arranged in a first direction, n being an integer equal to or more than 3;

determining a first calculation range of input pixel values of k pixels arranged further in the a first direction than the target pixel from among the input pixel values based on the parameter value corresponding to the target pixel;

calculating a first direction mean pixel value of the input pixel values falling within the first calculation range, k being an integer less than n/2;

determining a second calculation range of input pixel values of k pixels arranged further in a second direction, opposed to the first direction, than the target pixel from among the input pixel values based on the parameter value corresponding to the target pixel;

calculating a second direction mean pixel value of the input pixel values falling within the second calculation range;

determining a correction value correcting the first input value of the target pixel based on the relationship of the first direction mean pixel value the first input value of the target pixel, and the second direction mean pixel value;

adding the correction value to the first input value of the target pixel; and outputting the result of adding the first input value of the target pixel and the correction value as an output pixel value of the target pixel.

16. An image processing apparatus for acquiring, on a per access unit basis, a parameter value indicating characteristics of image blur taking place during image pickup of a moving image by a predetermined image pickup device, a plurality of access units forming the moving image, the image processing apparatus comprising a corrector correcting pixel values of a plurality of pixels forming an access unit to be processed, based on at least one of the parameter values corresponding to the access unit to be processed, the corrector including:

an acquisition unit setting, as a target pixel, one of the plurality of pixels forming the access unit to be processed, and acquiring input pixel values including a first input value of the target pixel from among one of n pixels centered on the target pixel and consecutively arranged in a first direction, n being an integer equal to or more than 3;

a first mean value calculating unit determining a first calculation range of input pixel values of k pixels arranged further in the first direction than the target pixel from among the input pixel values acquired by the acquisition unit based on the parameter value corresponding to the target pixel, and calculating a first direction mean pixel value of the input pixel values falling within the first calculation range, k being an integer less than n/2;

a second mean value calculating unit determining a second calculation range of input pixel values of k pixels arranged further in a second direction, opposed to the first direction, than the target pixel from among the input pixel values acquired by the acquisition unit based the parameter value corresponding to the target pixel, and calculating a second direction mean pixel value of the input pixel values falling within the second calculation range;

a correction value determination unit determining a correction value correcting the first input value of the target pixel based on the relationship of the first direction mean pixel value calculated by the first mean value calculating unit, the first input value of the target pixel, and the second direction mean pixel value calculated by the second mean value calculating unit; and a first adding unit adding the correction value to the first input value of the target pixel, and outputting the result of adding the first input value of the target pixel and the correction value as an output pixel value of the target pixel.

* * * * *